US012604312B2

(12) United States Patent
Rudolf

(10) Patent No.: US 12,604,312 B2
(45) Date of Patent: Apr. 14, 2026

(54) METHODS AND APPARATUSES FOR TRANSMISSION TIMING USING A TRANSMISSION TIMING CONFIGURATION IN FULL-DUPLEX SYSTEMS

(71) Applicant: Samsung Electronics Co., Ltd., Suwon-si (KR)

(72) Inventor: Marian Rudolf, Longueuil (CA)

(73) Assignee: Samsung Electronics Co., Ltd., Suwon-si (KR)

( * ) Notice: Subject to any disclaimer, the term of this patent is extended or adjusted under 35 U.S.C. 154(b) by 528 days.

(21) Appl. No.: 18/058,685

(22) Filed: Nov. 23, 2022

(65) Prior Publication Data
US 2023/0180224 A1 Jun. 8, 2023

Related U.S. Application Data

(60) Provisional application No. 63/285,579, filed on Dec. 3, 2021.

(51) Int. Cl.
| | |
|---|---|
| *H04W 72/1268* | (2023.01) |
| *H04W 72/0446* | (2023.01) |
| *H04L 5/14* | (2006.01) |

(52) U.S. Cl.
CPC ... *H04W 72/1268* (2013.01); *H04W 72/0446* (2013.01); *H04L 5/14* (2013.01)

(58) Field of Classification Search
None
See application file for complete search history.

(56) References Cited

U.S. PATENT DOCUMENTS

| | | |
|---|---|---|
| 2014/0008048 A1 | 1/2014 | Bisson |
| 2018/0014301 A1* | 1/2018 | Chen ..................... H04W 72/23 |

(Continued)

FOREIGN PATENT DOCUMENTS

| | | |
|---|---|---|
| WO | 2017218168 A1 | 12/2017 |
| WO | 2018204806 A1 | 11/2018 |

(Continued)

OTHER PUBLICATIONS

"3rd Generation Partnership Project; Technical Specification Group Radio Access Network; NR; Physical channels and modulation (Release 16)", 3GPP TS 38.211 V16.6.0, Jun. 2021, 134 pages.

(Continued)

*Primary Examiner* — Xavier S Wong

(57) ABSTRACT

Methods and apparatuses for transmission timing in full-duplex wireless communication systems. A method for transmitting an uplink (UL) signal or channel associated with a transmission timing procedure includes receiving first information for first parameters of a first transmission timing configuration associated with a first subset of slots from a set of slots on a cell, second information for second parameters of a second transmission timing configuration associated with a second subset of slots from the set of slots on the cell, and third information for a condition. The method further includes determining whether the condition is valid for transmission in a slot from the second subset of slots and transmitting the UL signal or channel in the slot based on the first transmission timing configuration when the condition is valid and the second transmission timing configuration when the condition is not valid.

20 Claims, 13 Drawing Sheets

(56) References Cited

U.S. PATENT DOCUMENTS

| | | | |
|---|---|---|---|
| 2018/0084546 A1 | 3/2018 | Guo et al. | |
| 2018/0270644 A1 | 9/2018 | Koorapaty et al. | |
| 2019/0222411 A1 | 7/2019 | Xie et al. | |
| 2019/0246398 A1 | 8/2019 | Chen et al. | |
| 2020/0127771 A1* | 4/2020 | Papasakellariou | H04L 1/1812 |
| 2020/0235980 A1 | 7/2020 | John Wilson et al. | |
| 2020/0374822 A1 | 11/2020 | Dinan | |
| 2021/0250988 A1* | 8/2021 | Taherzadeh Boroujeni | |
| | | | H04W 72/0446 |
| 2021/0297976 A1 | 9/2021 | Medina Acosta et al. | |
| 2021/0345362 A1* | 11/2021 | Kim | H04L 5/0012 |
| 2021/0352604 A1 | 11/2021 | Yang et al. | |
| 2022/0015034 A1* | 1/2022 | Miao | H04W 72/23 |
| 2022/0110117 A1* | 4/2022 | Bai | H04W 72/23 |
| 2023/0075417 A1* | 3/2023 | Abotabl | H04L 5/0098 |
| 2023/0108216 A1 | 4/2023 | You | |
| 2023/0179369 A1* | 6/2023 | Xu | H04L 5/0094 |
| | | | 370/336 |
| 2023/0262635 A1 | 8/2023 | Tan et al. | |
| 2024/0147397 A1 | 5/2024 | Lin et al. | |
| 2024/0172215 A1 | 5/2024 | Matsumura et al. | |
| 2025/0038906 A1* | 1/2025 | Park | H04W 24/10 |

FOREIGN PATENT DOCUMENTS

| | | |
|---|---|---|
| WO | 2019042335 A1 | 3/2019 |
| WO | 2019060197 A1 | 3/2019 |
| WO | 2021226396 A2 | 11/2021 |

OTHER PUBLICATIONS

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"5G; NR; Physical layer measurements (3GPP TS 38.215 version 16.4.0 Release 16)", ETSI TS 138 215 V16.4.0, Jan. 2021, 31 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.

"5G; NR; Requirements for support of radio resource management (3GPP TS 38.133 version 16.8.0 Release 16)", ETSI TS 138 133 V16.8.0, Sep. 2021, 2886 pages.

International Search Report and Written Opinion issued Mar. 2, 2023 regarding International Application No. PCT/KR2022/019814, 8 pages.

International Search Report and Written Opinion issued Mar. 13, 2023 regarding International Application No. PCT/KR2022/019532, 8 pages.

Extended European Search Report issued Jan. 29, 2025 regarding Application No. 22804662.8, 8 pages.

Extended European Search Report issued Jan. 31, 2025 regarding Application No. 22901876.7, 8 pages.

USPTO, Office Action issued Dec. 4, 2024 regarding U.S. Appl. No. 18/058,813, 22 pages.

USPTO, Final Office Action issued Apr. 10, 2025 regarding U.S. Appl. No. 18/058,813, 14 pages.

USPTO, Office Action issued Oct. 1, 2025 regarding U.S. Appl. No. 18/058,813, 16 pages.

* cited by examiner

600

| Downlink frame $i$ |
|---|

| Uplink frame $i$ |
|---|

$(N_{TA} + N_{TA,offset}) T_c$

700

| TAG ID | Timing Advance Command | Oct 1 |
|---|---|---|

800

| R | R | R | R | Timing Advance Command | Oct 1 |
|---|---|---|---|---|---|
| Timing Advance Command | | | | | Oct 2 |

900

| R | R | R | R | R | $T_{delta}$ | Oct 1 |
|---|---|---|---|---|---|---|
| $T_{delta}$ | | | | | | Oct 2 |

1000

1100

1300

1400

1800

UL transmission from UE is triggered for UL slot $i$

UE determines signal type of UL transmission in UL slot $i$

UE determines timing adjustment value $N_{delta,type}$ which is configured for the UL signal $N_{delta,type} = 0$ ?

YES

NO

UE determines $(N_{TA} + N_{TA,offset})*T_c$

UE determines $(N_{TA} + N_{TA,offset} + N_{delta,type})*T_c$

UE transmits in UL slot $i$

METHODS AND APPARATUSES FOR TRANSMISSION TIMING USING A TRANSMISSION TIMING CONFIGURATION IN FULL-DUPLEX SYSTEMS

CROSS-REFERENCE TO RELATED APPLICATIONS AND CLAIM OF PRIORITY

The present application claims priority to U.S. Provisional Patent Application No. 63/285,579, filed on Dec. 3, 2021. The content of the above-identified patent document is incorporated herein by reference.

TECHNICAL FIELD

The present disclosure relates generally to wireless communication systems and, more specifically, the present disclosure relates to a transmission timing in full-duplex wireless communication systems.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a transmission timing in full-duplex wireless communication systems.

In one embodiment, a method for transmitting an uplink (UL) signal or channel associated with a transmission timing procedure is provided. The method includes receiving first information for first parameters of a first transmission timing configuration associated with a first subset of slots from a set of slots on a cell, second information for second parameters of a second transmission timing configuration associated with a second subset of slots from the set of slots on the cell, and third information for a condition. The method further includes determining whether the condition is valid for transmission in a slot from the second subset of slots and transmitting the UL signal or channel in the slot based on the first transmission timing configuration when the condition is valid and the second transmission timing configuration when the condition is not valid.

In another embodiment, a user equipment (UE) is provided. The UE includes a transceiver configured to receive first information for first parameters of a first transmission timing configuration associated with a first subset of slots from a set of slots on a cell, second information for second parameters of a second transmission timing configuration associated with a second subset of slots from the set of slots on the cell, and third information for a condition. The UE further includes a processor operably coupled to the transceiver. The processor is configured to determine whether the condition is valid for transmission in a slot from the second subset of slots. The transceiver is further configured to transmit an UL signal or channel in the slot based on the first transmission timing configuration when the condition is valid and the second transmission timing configuration when the condition is not valid.

In yet another embodiment, a base station (BS) is provided. The BS includes a transceiver configured to transmit first information for first parameters of a first transmission timing configuration associated with a first subset of slots from a set of slots on a cell, second information for second parameters of a second transmission timing configuration associated with a second subset of slots from the set of slots on the cell, and third information for a condition. The BS further includes a processor operably coupled to the transceiver. The processor is configured to determine whether the condition is valid for reception in a slot from the second subset of slots. The transceiver is further configured to receive an uplink UL signal or channel in the slot based on the first transmission timing configuration when the condition is valid and the second transmission timing configuration when the condition is not valid.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.6.0, "NR, Physical channels and modulation"; 3GPP TS 38.212 v16.6.0, "NR, Multiplexing and Channel coding"; 3GPP TS 38.213 v16.6.0, "NR, Physical Layer Procedures for Control"; 3GPP TS 38.214 v16.6.0, "NR, Physical Layer Procedures for Data"; 3GPP TS 38.215 v16.4.0, "NR, Physical Layer Measurements"; 3GPP TS 38.321 v16.5.0, "NR, Medium Access Control (MAC) protocol specification" and 3GPP TS 38.331 v16.5.0, "NR, Radio Resource Control (RRC) Protocol Specification"; and 3GPP TS 38.133 v16.8.0, "NR; Requirements for support of radio resource management."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
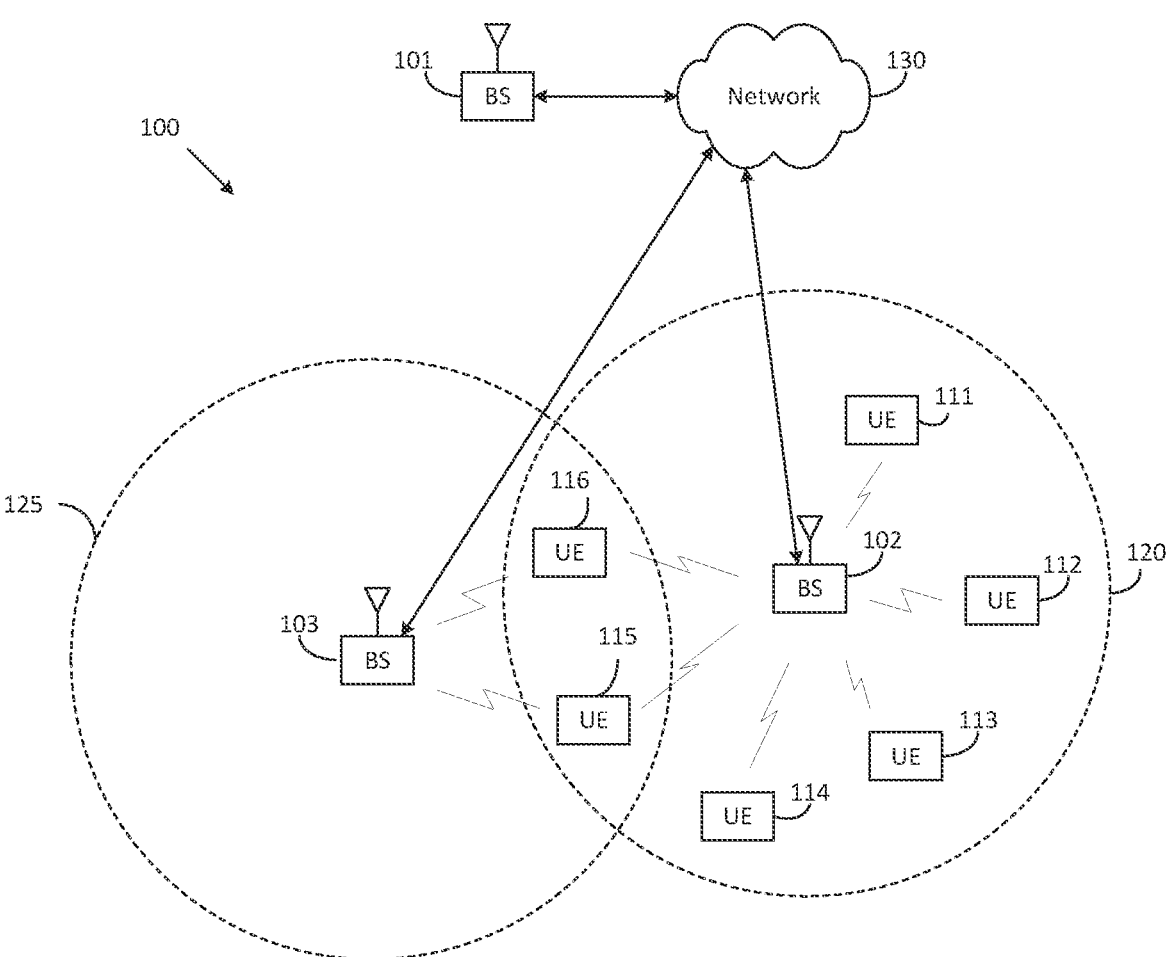
FIG. 1 illustrates an example of wireless network according to embodiments of the present disclosure.
Figure 2:
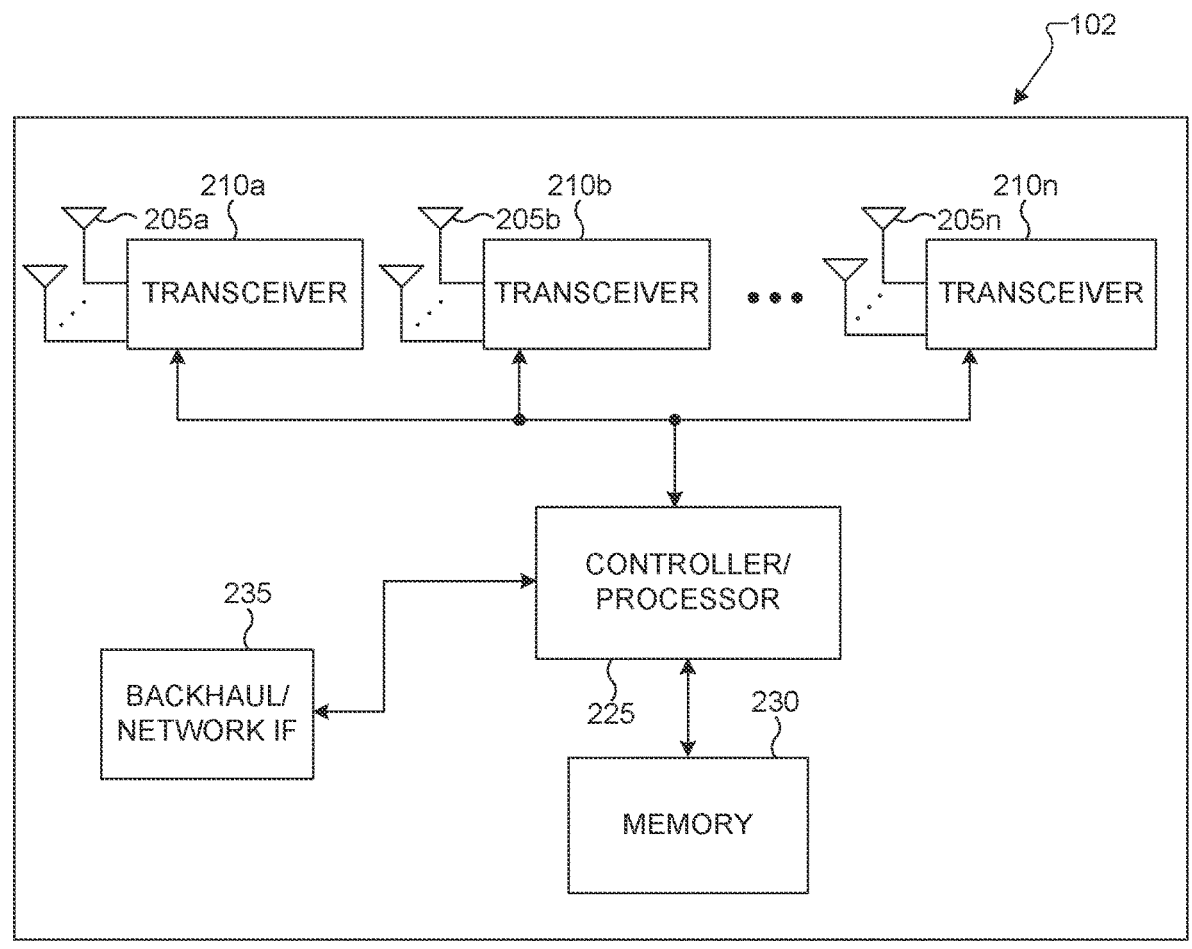
FIG. 2 illustrates an example of a base station (gNB) according to embodiments of the present disclosure.
Figure 3:
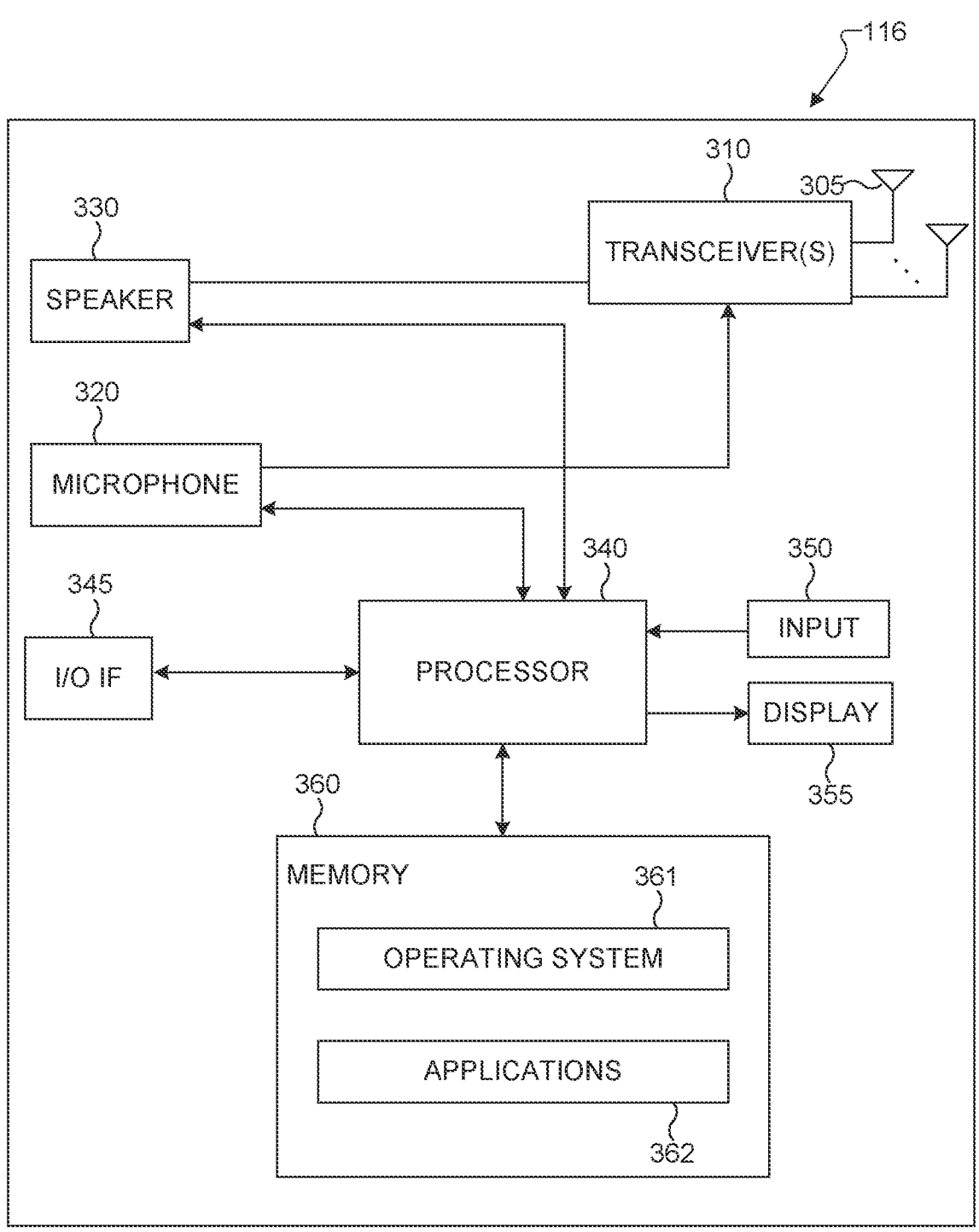
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a transmission timing in full-duplex wireless communication systems. In certain embodiments, and one or more of the gNBs 101-103 includes circuitry, programing, or a combination thereof, for a transmission timing in full-duplex wireless communication systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, the gNB 102 could support transmission timing in full-duplex wireless communication systems. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna(s) 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver (s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310 in accordance with well-known principles. In some embodiments, the processor 340 includes at least one microprocessor or microcontroller.

The processor 340 is also capable of executing other processes and programs resident in the memory 360, such as processes for a transmission timing in full-duplex wireless communication systems. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
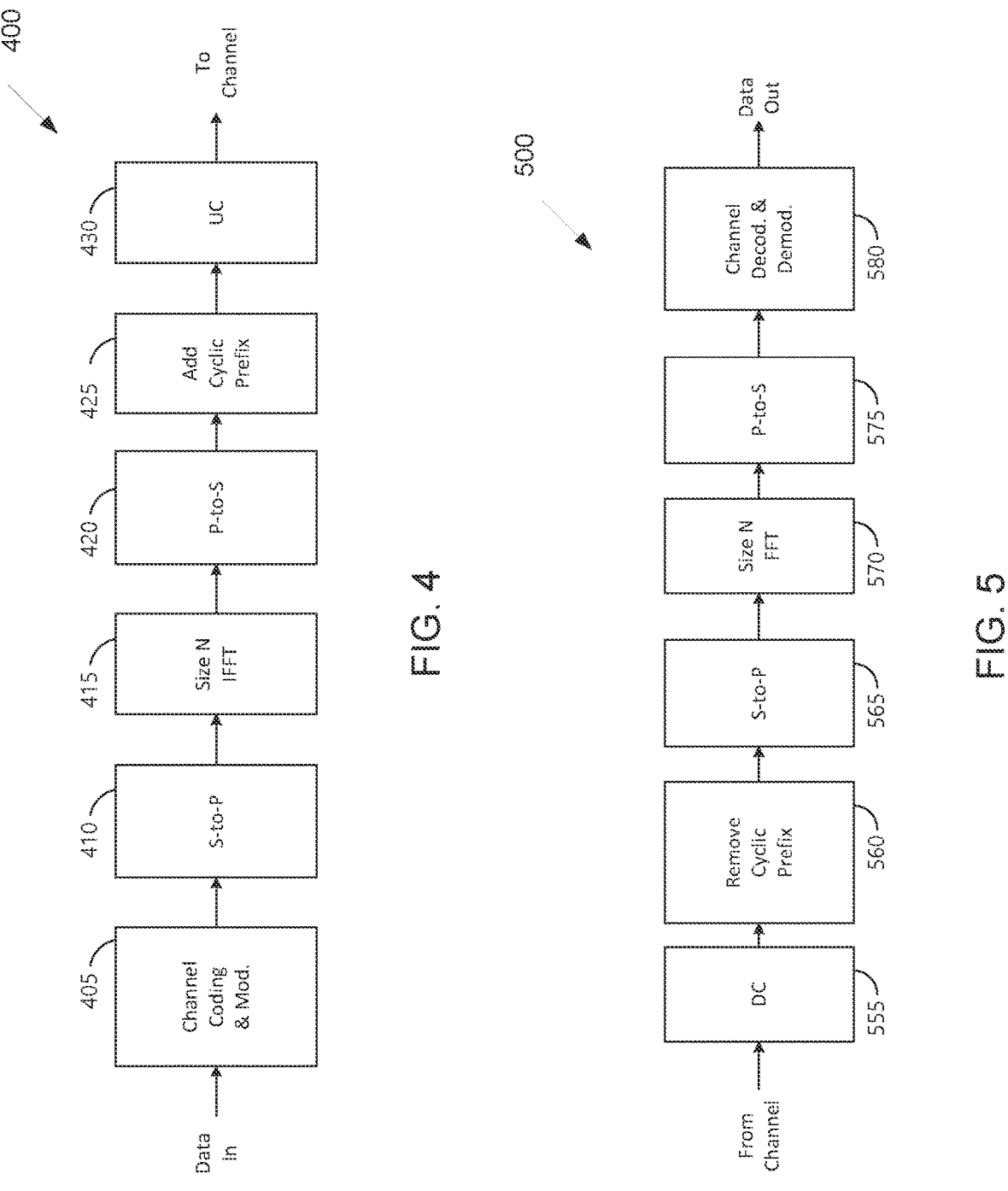
FIGS. 4 and 5 illustrate example of wireless transmit and receive paths according to embodiments of the present disclosure.

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a transmission configuration indication state (TCI state) of a control resource set (CORESET) where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH. UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel.

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same precoder resource group (PRG).

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that synchronized signal/physical broadcasting blocks (SSBs) transmitted with the same block index on the same center frequency location are quasi co-located with respect to Doppler spread, Doppler shift, average gain, average delay, delay spread, and, when applicable, spatial Rx parameters. The UE may not assume quasi co-location for any other SS/PBCH block transmissions.

In absence of CSI-RS configuration, and unless otherwise configured, the UE may assume PDSCH DM-RS and SSB to be quasi co-located with respect to Doppler shift, Doppler spread, average delay, delay spread, and, when applicable, spatial Rx parameters. The UE may assume that the PDSCH DM-RS within the same code division multiplexing (CDM) group are quasi co-located with respect to Doppler shift, Doppler spread, average delay, delay spread, and spatial Rx. The UE may also assume that DMRS ports associated with a PDSCH are quasi-colocation (QCL) with QCL type A, type D (when applicable) and average gain. The UE may further assume that no DM-RS collides with the SS/PBCH block.

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a QCL relationship between one or two downlink reference signals and the DMRS ports of the PDSCH, the DMRS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values: QCL-TypeA: {Doppler shift, Doppler spread, average delay, delay spread}; QCL-TypeB: {Doppler shift, Doppler spread}; QCL-TypeC: {Doppler shift, average delay}; and QCL-TypeD: {Spatial Rx parameter}.

The UE receives a MAC-control element (MAC-CE) activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot e.g., $$n + 3N_{slot}^{subframe,\mu}.$$

The NR UL allows for an operation with intra-cell orthogonality. UL transmissions received from the UEs within a cell do not create interference to each other. This implies that UL slot boundaries for a given SCS may be received approximately time aligned at the gNB. Ideally, the Rx timing misalignment between the UL signals from UEs may fall within the CP. Like LTE and other cellular communications systems, NR includes a UE UL transmit timing procedure. timing advance is a negative transmission time offset at the UE between the start of a DL slot as observed by the UE and the start of a slot in the UL.

When the transmission time offset is controlled for each UE, the gNB can control the timing of the signals received at the gNB from the UEs. UEs far from the gNB have a larger propagation delay and need to start their UL transmissions more in advance compared to UEs located closer to the gNB. The value of the timing advance for each UE can be determined by the gNB through different means. For example, measurements on the respective UL transmissions like SRS, PUCCH, or PUSCH from the UEs can be used.

When UEs carry out UL transmissions, the receiving gNB can estimate the UL receive timing and thus issue the corresponding timing advance (TA) commands in the DL. TA commands are UE specific and transmitted as a MAC CE on the DL-SCH. TA commands for a UE are transmitted relatively infrequently, e.g., one or a few times per second. When a UE moves fast, TA commands can be transmitted more frequently. Because the target of the TA procedure is to keep the Rx timing misalignment between UL signals transmitted from UEs at the gNB within the size of the CP, the step size of the TA is chosen as a fraction of the CP. Different from LTE, NR supports multiple numerologies. The CP becomes shorter the higher the SCS, so the NR TA step size is scaled in proportion to the CP length and obtained by the SCS of the active UL BWP.

When a UE has not received a TA command during a configurable time period, the UE assumes that the UE has lost UL synchronization. In this case, the UE may reestablish UL timing using the random access procedure first before any subsequent PUSCH or PUCCH transmission in the UL.

In the cases of carrier aggregation or dual connectivity, there may be two or more component carriers transmitted from a UE. When the different UL component carriers from the UE are all received at the same geographical location, a same TA value can be employed for all UL component carriers. When different UL component carriers are received at different geographical locations, the different UL carriers need different TA values to align the UL Rx timings at the distinct reception sites. This is the case for gNB deployments using remote radio heads or with dual connectivity where different UL component carriers are terminated at different sites. In these cases, LTE and NR group the UL component carriers in timing advance groups (TAGs) and different TA commands apply to different TAGs. All component carriers in the same group are subject to the same TA command. The TA step size is determined by the highest SCS among the carriers in a TAG.

The NR DL and UL transmissions are organized into frames with $T_f=(\Delta f_{max}N_f/100)\cdot T_c=10$ ms duration, each consisting of ten subframes of $T_{fs}=(\Delta f_{max}N_f/1000)\cdot T_c=1$ ms duration. The time units $T_c=1/(\Delta f_{max}\cdot N_f)$ where $\Delta f_{max}=480\cdot10^3$ Hz and $N_f=4096$ are defined in 3GPP standard specification. The constant $\kappa=T_s/T_c=64$ where $T_s=1/(\Delta f_{ref}N_{f,ref})$, $\Delta f_{ref}=15\cdot10^3$ Hz and $N_{f,ref}=2048$. The number of consecutive OFDM symbols per subframe is $$N_{symb}^{subframe,\mu} = N_{symb}^{slot}N_{slot}^{subframe,\mu}.$$

Each frame is divided into two equally-sized half-frames of five subframes each with half-frame 0 consisting of subframes 0-4 and half-frame 1 consisting of subframes 5-9. There is one set of frames in the UL and one set of frames in the DL on a carrier.

Figures 6, 7, 8, 9:
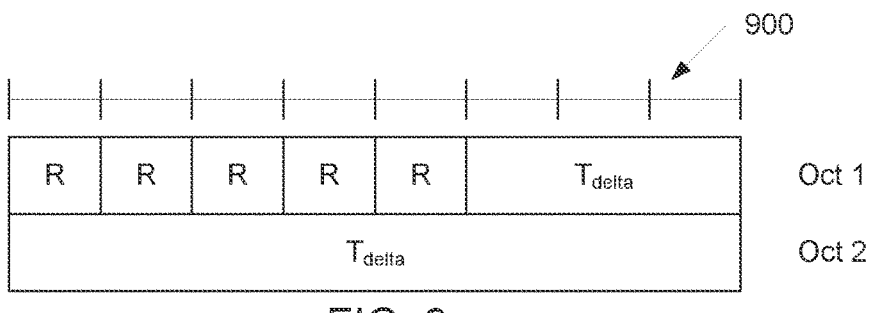
FIG. 6 illustrates an UL-DL timing relation in NR according to embodiments of the present disclosure.
FIG. 7 illustrates a timing advance command MAC CE according to embodiments of the present disclosure.
FIG. 8 illustrates an absolute timing advance command MAC CE according to embodiments of the present disclosure.
FIG. 9 illustrates a timing delta MAC CE according to embodiments of the present disclosure.

As shown in FIG. 6, UL frame number for transmission from the UE starts $T_{TA}=(N_{TA}+N_{TA,offset})T_c$ before the start of the corresponding DL frame at the UE where $N_{TA,offset}$ is given in 3GPP standard specification, except for MsgA transmission on PUSCH where $N_{TA}=0$ is used.

FIG. 6 illustrates an UL-DL timing relation in NR 600 according to embodiments of the present disclosure. An embodiment of the UL-DL timing relation in NR 600 shown in FIG. 6 is for illustration only.

A UE can be provided a value $N_{TA,offset}$ of a timing advance offset for a serving cell by parameter n-TimingAdvanceOffset for the serving cell. If the UE is not provided n-TimingAdvanceOffset for a serving cell, the UE determines a default value $N_{TA,offset}$ of the timing advance offset for the serving cell as described in 3GPP standard specification. If a UE is configured with two UL carriers for a serving cell, a same timing advance offset value $N_{TA,offset}$ applies to both carriers.

A UE can be configured with one or more timing advance group (TAG). A TAG is a group of Serving Cells that is configured by RRC for cells with an UL using the same timing reference cell and the same timing advance value. A timing advance group containing the SpCell of a MAC entity is referred to as primary timing advance group (PTAG), whereas the term secondary timing advance group (STAG) refers to other TAGs.

Upon reception of a timing advance command for a TAG, the UE adjusts UL timing for PUSCH, SRS, or PUCCH transmission on all the serving cells in the TAG based on a value $N_{TA,offset}$ that the UE expects to be same for all the serving cells in the TAG and based on the received timing advance command where the UL timing for PUSCH, SRS or PUCCH transmissions is the same for all the serving cells in the TAG.

For a band with synchronous contiguous intra-band EN-DC in a band combination with non-applicable maximum transmit timing difference requirements as described in 3GPP standard specification, if the UE indicates ul-TiminingAlignmentEUTRA-NR as "required" and UL transmission timing based on timing adjustment indication for a TAG from MCG and a TAG from SCG are determined to be different by the UE, the UE adjusts the transmission timing for PUSCH/SRS/PUCCH transmission on all serving cells part of the band with the synchronous contiguous intra-band EN-DC based on timing adjustment indication for a TAG from a serving cell in MCG in the band. The UE is not expected to transmit a PUSCH/SRS/PUCCH in one CG when the PUSCH/SRS/PUCCH is overlapping in time, even partially, with random access preamble transmitted in another CG.

For a SCS of $2^\mu\cdot15$ kHz, the timing advance command for a TAG indicates the change of the UL timing relative to the current UL timing for the TAG in multiples of $16\cdot64\cdot T_c/2^\mu$. The start timing of the random access preamble is handled differently by the UE and described in 3GPP standard specification.

A timing advance command received by random access response or by an absolute timing advance command MAC CE (as shown in 3GPP standard specification), $T_A$, for a TAG indicates $N_{TA}$ values by index values of $T_A=0, 1, 2, \ldots, 3486$, where an amount of the time alignment for the TAG with SCS of $2^\mu\cdot15$ kHz is $N_{TA}=T_A\cdot16\cdot64/2^\mu$. $N_{TA}$ is defined in 3GPP standard specification and is relative to the SCS of the first UL transmission from the UE after the reception of the random access response or absolute timing advance command MAC CE.

In other cases, a timing advance command received by timing advance command MAC CE (as shown in 3GPP standard specification), $T_A$, for a TAG indicates adjustment of a current $N_{TA}$ value, $N_{TA\_old}$, to the new $N_{TA}$ value, $N_{TA\_new}$, by index values of $T_A$=0, 1, 2, . . . , 63, where for a SCS of $2^\mu$·15 kHz, $N_{TA\_new}$=$N_{TA\_old}$+$(T_A-31)$·16·64/$2^\mu$.

If a UE has multiple active UL BWPs in a same TAG, including UL BWPs in two UL carriers of a serving cell, the timing advance command value is relative to the largest SCS of the multiple active UL BWPs. The applicable $N_{TA\_new}$ value for an UL BWP with lower SCS may be rounded to align with the timing advance granularity for the UL BWP with the lower SCS while satisfying the timing advance accuracy requirements in 3GPP standard specification.

Adjustment of an $N_{TA}$ value by a positive or a negative amount indicates advancing or delaying the UL transmission timing for the TAG by a corresponding amount, respectively.

For a timing advance command received on UL slot n and for a transmission other than a PUSCH scheduled by a random access response (RAR) UL grant or a fallbackRAR UL grant, or a PUCCH with HARQ-ACK information in response to a successRAR, the corresponding adjustment of the UL transmission timing applies from the beginning of UL slot n+k+1 where $$k = \left\lceil N_{slot}^{subframe,\mu} \cdot (N_{T,1} + N_{T,2} + N_{TA,max} + 0.5 / T_{sf}) \right\rceil,$$

$N_{T,1}$ is a time duration in msec of $N_1$ symbols corresponding to a PDSCH processing time for UE processing capability 1 (as shown in 3GPP standard specification) when additional PDSCH DM-RS is configured, $N_{T,2}$ is a time duration in msec of $N_2$ symbols corresponding to a PUSCH preparation time for UE processing capability 1 (as shown in 3GPP standard specification), $N_{TA,max}$ is the maximum timing advance value in msec that can be provided by a TA command field of 12 bits, $$N_{slot}^{subframe,\mu}$$

is the number of slots per subframe, and $T_{sf}$ is the subframe duration of 1 msec. $N_1$ and $N_2$ are determined with respect to the minimum SCS among the SCSs of all configured UL BWPs for all UL carriers in the TAG and of all configured DL BWPs for the corresponding downlink carriers.

For $\mu$=0, the UE assumes $N_{1,0}$=14 (as shown in 3GPP standard specification). Slot n and $$N_{slot}^{subframe,\mu}$$

are determined with respect to the minimum SCS among the SCSs of all configured UL BWPs for all UL carriers in the TAG. $N_{TA,max}$ is determined with respect to the minimum SCS among the SCSs of all configured UL BWPs for all UL carriers in the TAG and for all configured initial UL BWPs provided by initialUplinkBWP. The UL slot n is the last slot among UL slot(s) overlapping with the slot(s) of PDSCH reception assuming $T_{TA}$=0, where the PDSCH provides the timing advance command and $T_{TA}$ is defined in 3GPP standard specification.

If a UE changes an active UL BWP between a time of a timing advance command reception and a time of applying a corresponding adjustment for the UL transmission timing, the UE determines the timing advance command value based on the SCS of the new active UL BWP. If the UE changes an active UL BWP after applying an adjustment for the UL transmission timing, the UE assumes a same absolute timing advance command value before and after the active UL BWP change.

If the received DL timing changes and is not compensated or is only partly compensated by the UL timing adjustment without timing advance command as described in 3GPP standard specification, the UE changes $N_{TA}$ accordingly. If two adjacent slots overlap due to a TA command, the latter slot is reduced in duration relative to the former slot.

RRC configures the following parameters for the maintenance of UL time alignment: timeAlignmentTimer (per TAG) which controls how long the MAC entity considers the serving cells belonging to the associated TAG to be UL time aligned.

When a timing advance command MAC CE is received, and if an $N_{TA}$ as defined in 3GPP standard specification has been maintained with the indicated TAG, the MAC applies the timing advance command for the indicated TAG and starts or restarts the timeAlignmentTimer associated with the indicated TAG.

When a timing advance command is received in a random access response message for a serving cell belonging to a TAG or in a MsgB for an SpCell, the MAC applies the timing advance command for this TAG, starts or restarts the timeAlignmentTimer associated with this TAG if the random access preamble was not selected by the MAC entity among the contention-based random access preamble, else if the timeAlignmentTimer associated with this TAG is not running, it applies the timing advance command for this TAG and starts the timeAlignmentTimer associated with this TAG. When contention resolution is considered not successful; the MAC entity stops the timeAlignmentTimer associated with this TAG.

When a timeAlignmentTimer associated with the primary TAG expires, the MAC entity flushes all HARQ buffers for all serving cells, notifies RRC to release PUCCH and/or SRS for all serving cells, and if configured, clears any configured DL assignments and configured UL grants, clears any PUSCH resource for semi-persistent CSI reporting, considers all running timeAlignmentTimers as expired, but maintains $N_{TA}$ (as shown in 3GPP standard specification) of all TAGs. A separate set of rules applies to the case when the timeAlignmentTimer associated with a secondary TAG expires.

When the MAC entity stops UL transmissions for an SCell due to the fact that the maximum UL transmission timing difference between TAGs of the MAC entity or the maximum UL transmission timing difference between TAGs of any MAC entity of the UE is exceeded, the MAC entity considers the timeAlignmentTimer associated with the SCell as expired.

The MAC entity does not perform any UL transmission on a Serving Cell except the random access preamble and MsgA transmission when the timeAlignmentTimer associated with the TAG to which this serving cell belongs is not running. Furthermore, when the timeAlignmentTimer associated with the primary TAG is not running, the MAC entity does not perform any UL transmission on any serving cell except the random access preamble and MsgA transmission on the SpCell.

FIG. 7 illustrates a timing advance command MAC CE 700 according to embodiments of the present disclosure. An embodiment of the timing advance command MAC CE 700 shown in FIG. 7 is for illustration only.

The timing advance command MAC CE is identified by MAC subheader with logical channel identification (LCID)=61 as defined in 3GPP standard specification. The timing advance command MAC CE has a fixed size and includes a single octet shown in FIG. 7. The timing advance command MAC CE contains the TAG identity (TAG ID) indicating the TAG identity of the addressed TAG. The TAG containing the SpCell has the TAG Identity 0. The length of the field is 2 bits. This MAC CE then contains the timing advance command. This field indicates the index value $T_A$ (0, 1, 2 . . . 63) used to control the amount of timing adjustment that MAC entity may apply as defined in 3GPP standard specification. The length of the field is 6 bits.

FIG. 8 illustrates an absolute timing advance command MAC CE 800 according to embodiments of the present disclosure. An embodiment of the absolute timing advance command MAC CE 800 shown in FIG. 8 is for illustration only.

The absolute timing advance command MAC CE is identified by MAC subheader with eLCID codepoint 252 as defined in 3GPP standard specification. The absolute timing advance command MAC CE has a fixed size and consists of two octets shown in FIG. 8. The absolute timing advance command MAC CE includes the timing advance command. This field indicates the index value TA used to control the amount of timing adjustment that the MAC entity may apply as defined in 3GPP standard specification. The size of the field is 12 bits. The 4 reserved bits R are set to 0.

NR UEs may have the capability to follow the frame timing changes of the reference cell in RRC_CONNECTED state. The UL frame transmission takes place $(N_{TA}+N_{TA\ offset})\times T_c$ before the reception of the first detected path (in time) of the corresponding DL frame from the reference cell. For serving cell(s) in the primary TAG, the UE uses the SpCell as the reference cell for deriving the UE transmit timing for cells in the primary TAG. For serving cell(s) in the secondary TAG, the UE can use any of the activated SCells as the reference cell for deriving the UE transmit timing for the cells in the secondary TAG. There are UE initial transmit timing accuracy, gradual timing adjustment and timing advance adjustment delay requirements.

The UE initial transmission timing error may be less than or equal to $\pm T_e$ where the timing error limit value $T_e$ as defined in 3GPP standard specification is shown in TABLE 1. This requirement applies when it is the first transmission in a discontinuous reception (DRX) cycle for PUCCH, PUSCH and, SRS, or it is the physical random access channel (PRACH) transmission, or it is the MsgA transmission. The UE may meet the $T_e$ requirement for an initial transmission provided that at least one SSB is available at the UE during the last 160 msec. The reference point for the UE initial transmit timing control requirement is the DL timing of the reference cell minus $(N_{TA}+N_{TA\ offset})\times T_c$.

The DL timing is defined as the time when the first detected path (in time) of the corresponding DL frame is received from the reference cell. $N_{TA}$ for PRACH is defined as 0. $(N_{TA}+N_{TA\ offset})\times T_c$ (in $T_c$ units) for other channels is the difference between UE transmission timing and the DL timing immediately after when the last timing advance was applied. $N_{TA}$ for other channels is not changed until next timing advance is received. The value of $N_{TA,offset}$ is defined by 3GPP standard specification is shown in TABLE 2. $N_{TA,offset}$ depends on the duplex mode of the cell in which the UL transmission takes place and the frequency range.

TABLE 1

| | | Timing error limit $T_e$ | | |
|---|---|---|---|---|
| Frequency Range | SCS of SSB signals (kHz) | SCS of uplink signals (kHz) | | $T_e$ |
| 1 | 15 | 15 | | $12*64*T_c$ |
| | | 30 | | $10*64*T_c$ |
| | | 60 | | $10*64*T_c$ |
| | 30 | 15 | | $8*64*T_c$ |
| | | 30 | | $8*64*T_c$ |
| | | 60 | | $7*64*T_c$ |
| 2 | 120 | 60 | | $3.5*64*T_c$ |
| | | 120 | | $3.5*64*T_c$ |
| | 240 | 60 | | $3*64*T_c$ |
| | | 120 | | $3*64*T_c$ |

Note 1:

$T_c$ is the basic timing unit defined in 3GPP standard specification

TABLE 2

| Value of $N_{TA,offset}$ | |
|---|---|
| Frequency range and band of cell used for uplink transmission | $N_{TA,offset}$ (Unit: $T_C$) |
| FR1 FDD or TDD band with neither E-UTRA-NR nor NB-IoT-NR coexistence case | 25600 (Note 1) |
| FR1 FDD band with E-UTRA-NR and/or NB-IoT-NR coexistence case | 0 (Note 1) |
| FR1 TDD band with E-UTRA-NR and/or NB-IoT-NR coexistence case | 39936 (Note 1) |
| FR2 | 13792 |

Note 1:

The UE identifies $N_{TA,\ offset}$ based on the information n-TimingAdvanceOffset as specified in 3GPP standard specification. If UE is not provided with the information n-TimingAdvanceOffset, the default value of $N_{TA,\ offset}$ is set as 25600 for FR1 band. In case of multiple UL carriers in the same TAG, UE expects that the same value of n-TimingAdvanceOffset is provided for all the UL carriers according to 3GPP standard specification and the value 39936 of $N_{TA,\ offset}$ can also be provided for a FDD serving cell.

When it is not the first transmission in a DRX cycle or there is no DRX cycle, and when it is the transmission for PUCCH, PUSCH and SRS transmission, the UE may be capable of changing the transmission timing according to the received DL frame of the reference cell except when the timing advance is applied.

When the transmission timing error between the UE and the reference timing exceeds $\pm T_e$ then the UE is required to adjust the UE's timing to within $\pm T_e$. The reference timing is $(N_{TA}+N_{TA\ offset})\times T_c$ before the DL timing of the reference cell.

All adjustments made by the UE to the UL transmit timing may follow these rules:

the maximum amount of the magnitude of the timing change in one adjustment is $T_q$;

the minimum aggregate adjustment rate is $T_p$ per second; and/or the maximum aggregate adjustment rate is $T_q$ per 200 ms.

In such instance, the maximum autonomous time adjustment step $T_q$ and the aggregate adjustment rate $T_p$ as defined in 3GPP standard specification are shown in TABLE 3.

19

TABLE 3

| Maximum autonomous time adjustment Step $T_q$ and minimum aggregate adjustment Rate $T_p$ | | | |
|---|---|---|---|
| Frequency Range | SCS of uplink signals (kHz) | $T_q$ | $T_p$ |
| 1 | 15 | $5.5*64*T_c$ | $5.5*64*T_c$ |
| | 30 | $5.5*64*T_c$ | $5.5*64*T_c$ |
| | 60 | $5.5*64*T_c$ | $5.5*64*T_c$ |
| 2 | 60 | $2.5*64*T_c$ | $2.5*64*T_c$ |
| | 120 | $2.5*64*T_c$ | $2.5*64*T_c$ |

NOTE:

$T_c$ is the basic timing unit defined in 3GPP standard specification

When a UE operates in EN-DC, NR-DC, NE-DC or NR SA operation modes and receives a MAC CE that implies the adjustment of the timing advance as defined in 3GPP standard specification, the UE may adjust the timing of the UE' UL transmission timing at time slot n+k+1 for a timing advance command received in time slot n, and where the value of k is defined by 3GPP standard specification. The relative accuracy of the adjustment for the signaled timing advance value when compared to the timing of the preceding UL transmission may be better than or equal to the UE timing advance adjustment accuracy requirement defined in 3GPP standard specification and shown in TABLE 4.

TABLE 4

| UE Timing advance adjustment accuracy | | | | |
|---|---|---|---|---|
| UL SCS (kHz) | 15 | 30 | 60 | 120 |
| UE timing advance adjustment accuracy | $\pm 256$ $T_c$ | $\pm 256$ $T_c$ | $\pm 128$ $T_c$ | $\pm 32$ $T_c$ |

Rel-16 NR introduced support for the integrated access and backhaul (IAB) feature. IAB-nodes are infrastructure relaying nodes capable of wirelessly relaying the uplink or downlink transmissions or receptions between UEs and gNBs. IAB operation can use NR or LTE radio in FR1 or FR2. In the context of Rel-16 IAB operation, there is an additional relative timing adjustment mechanism. For time-domain synchronization across multiple backhaul hops, an additional IAB timing adjustment $T_{delta}$ can be provided to the IAB node by a parent node of the IAB.

FIG. 9 illustrates a timing delta MAC CE 900 according to embodiments of the present disclosure. An embodiment of the timing delta MAC CE 900 shown in FIG. 9 is for illustration only.

This parameter is applicable only to IAB nodes and signaled using the timing delta MAC CE shown in FIG. 9. The timing delta MAC CE is identified by MAC subheader with eLCID codepoint 255. The timing delta MAC CE has a fixed size and includes two octets. The 5 reserved bits R are set to 0. $T_{delta}$ indicates the value (0, 1, 2 . . . 1199) used to control the amount of timing adjustment that MAC entity indicates and is defined in 3GPP standard specification. The length of the field is 11 bits.

If an IAB-node is provided an index $T_{delta}$ in a timing delta MAC CE from a serving cell, the IAB-node may assume that $(N_{TA}/2+N_{delta}+T_{delta} \cdot G_{step}) \cdot T_c$ is a time difference between a DU transmission of a signal from the serving cell and a reception of the signal by the IAB-MT when $N_{TA}/2+N_{delta}+T_{delta} \cdot G_{step}>0$. The IAB-node may use the time difference to determine an IAB-DU transmission time.

$N_{TA}$ is obtained as for a "UE" in 3GPP standard specification for the TAG containing the serving cell. $N_{delta}$ and $G_{step}$ are determined as:

$N_{delta}=-70528$ and $G_{step}=64$, for an FR1 serving cell providing the timing delta MAC CE; and/or $N_{delta}=-17664$ and $G_{step}=32$, for an FR2 serving cell providing the timing delta MAC CE.

Figure 10:
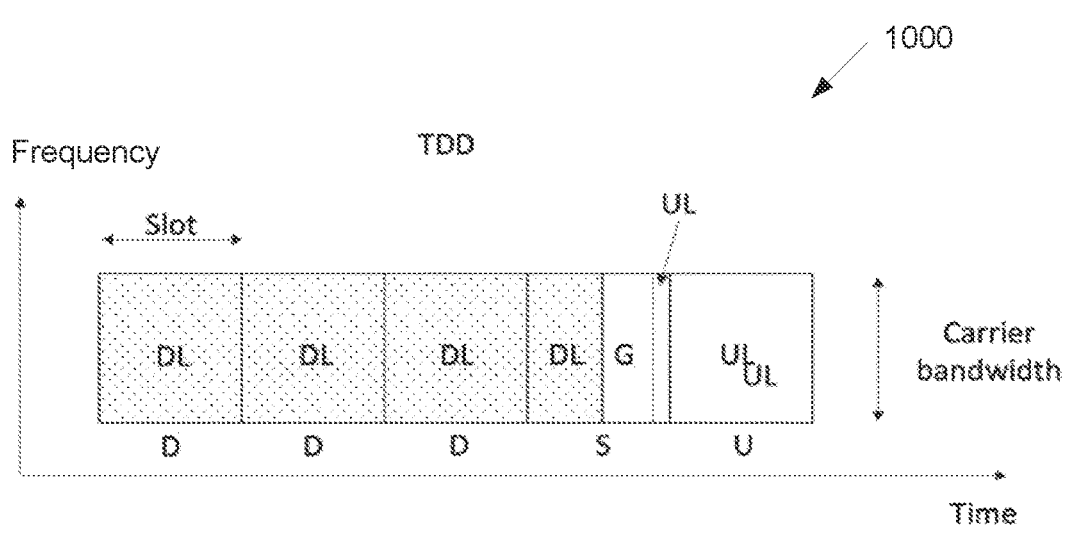
FIG. 10 illustrates an example TDD communication system according to embodiments of the present disclosure.

5G NR radio supports time-division duplex (TDD) operation and frequency division duplex (FDD) operation. Use of FDD or TDD depends on the NR frequency band and per-country allocations. TDD is required in most bands above 2.5 GHz. FIG. 10 illustrates an example structure of slots or single-carrier TDD UL-DL frame configuration for a TDD communications system according to the embodiments of the disclosure.

FIG. 10 illustrates an example TDD communication system 1000 according to embodiments of the present disclosure. An embodiment of the TDD communication system 1000 shown in FIG. 10 is for illustration only.

A DDDSU UL-DL configuration is shown, where D denotes a DL slot, U denotes an UL slot, and S denotes a special or switching slot with a DL part, a flexible part that can also be used as guard period G for DL-to-UL switching, and optionally an UL part.

TDD has a number of advantages over FDD. For example, use of the same band for DL and UL transmissions leads to simpler UE implementation with TDD because a duplexer is not required. Another advantage is that time resources can be flexibly assigned to UL and DL considering an asymmetric ratio of traffic in both directions. DL is typically assigned most time resources in TDD to handle DL-heavy mobile traffic. Another advantage is that channel state information (CSI) can be more easily acquired via channel reciprocity. This reduces an overhead associated with CSI reports especially when there is a large number of antennas.

Although there are advantages of TDD over FDD, there are also disadvantages. A first disadvantage is a smaller coverage of TDD due to the usually small portion of time resources available for UL transmissions, while with FDD all time resources can be used for UL transmissions. Another disadvantage is latency.

In TDD, a timing gap between DL reception and UL transmission containing the hybrid automatic repeat request acknowledgement (HARQ-ACK) information associated with DL receptions is typically larger than that in FDD, for example by several milliseconds. Therefore, the HARQ round trip time in TDD is typically longer than that with FDD, especially when the DL traffic load is high. This causes increased UL user plane latency in TDD and can cause data throughput loss or even HARQ stalling when a PUCCH providing HARQ-ACK information needs to be transmitted with repetitions in order to improve coverage (an alternative in such case is for a network to forgo HARQ-ACK information at least for some transport blocks in the DL).

To address some of the disadvantages for TDD operation, a dynamic adaptation of link direction has been considered where, with the exception of some symbols in some slots supporting predetermined transmissions such as for SSBs, symbols of a slot can have a flexible direction (UL or DL) that a UE can determine according to scheduling information for transmissions or receptions. A PDCCH can also be used to provide a DCI format, such as a DCI format 2_0 as described in 3GPP standard specification, which can indicate a link direction of some flexible symbols in one or more slots.

Nevertheless, in actual deployments, it is difficult for a gNB scheduler to adapt a transmission direction of symbols without coordination with other gNB schedulers in the network. This is because of cross-link interference (CLI) where, for example, DL receptions in a cell by a UE can experience large interference from UL transmissions in the same or neighboring cells from other UEs.

Full-duplex (FD) communications offer a potential for increased spectral efficiency, improved capacity, and reduced latency in wireless networks. When using FD communications, UL and DL signals are simultaneously received and transmitted on fully or partially overlapping, or adjacent, frequency resources, thereby improving spectral efficiency and reducing latency in user and/or control planes.

There are several options for operating a full-duplex wireless communication system. For example, a single carrier may be used such that transmissions and receptions are scheduled on same time-domain resources, such as symbols or slots. Transmissions and receptions on same symbols or slots may be separated in frequency, for example by being placed in non-overlapping sub-bands. An UL frequency sub-band, in time-domain resources that also include DL frequency sub-bands, may be located in the center of a carrier, or at the edge of the carrier, or at a selected frequency-domain position of the carrier. The allocations of DL sub-bands and UL sub-bands may also partially or even fully overlap.

A gNB may simultaneously transmit and receive in time-domain resources using same physical antennas, antenna ports, antenna panels and transmitter-receiver units (TRX). Transmission and reception in FD may also occur using separate physical antennas, ports, panels, or TRXs. Antennas, ports, panels, or TRXs may also be partially reused or only respective subsets can be active for transmissions and receptions when FD communication is enabled.

Instead of using a single carrier, it is also possible to use different component carriers (CCs) for receptions and transmissions by a UE. For example, receptions by a UE can occur on a first CC and transmissions by the UE occur on a second CC having a small, including zero, frequency separation from the first CC.

Furthermore, a gNB can operate with full-duplex mode even when a UE still operates in half-duplex mode, such as when the UE can either transmit and receive at a same time, or the UE can also be capable for full-duplex operation.

A full-duplex transmission/reception is not limited to gNBs, TRPs, or UEs, but can also be used for other types of wireless nodes such as relay or repeater nodes.

A full duplex operation needs to overcome several challenges in order to be functional in actual deployments. When using overlapping frequency resources, received signals are subject to co-channel cross-link interference (CLI) and self-interference. CLI and self-interference cancellation methods include passive methods that rely on isolation between transmit and receive antennas, active methods that utilize RF or digital signal processing, and hybrid methods that use a combination of active and passive methods. Filtering and interference cancellation may be implemented in RF, baseband (BB), or in both RF and BB. While mitigating co-channel CLI may require large complexity at a receiver, it is feasible within current technological limits. Another aspect of FD operation is the mitigation of adjacent channel CLI because in several cellular band allocations, different operators have adjacent spectrum.

Throughout the disclosure, cross-division-duplex (XDD) is used as a short form for a full-duplex operation. The terms XDD and full-duplex are interchangeably used in the disclosure. Full-duplex operation in NR can improve spectral efficiency, link robustness, capacity, and latency of UL transmissions. In an NR TDD system, UL transmissions are limited by fewer available transmission opportunities than DL receptions. For example, for NR TDD with SCS=30 kHz, DDDU (2 msec), DDDSU (2.5 msec), or DDDDDDD-SUU (5 msec), the UL-DL configurations allow for an DL:UL ratio from 3:1 to 4:1. Any UL transmission can only occur in a limited number of UL slots, for example every 2, 2.5, or 5 msec, respectively.

Figure 11:
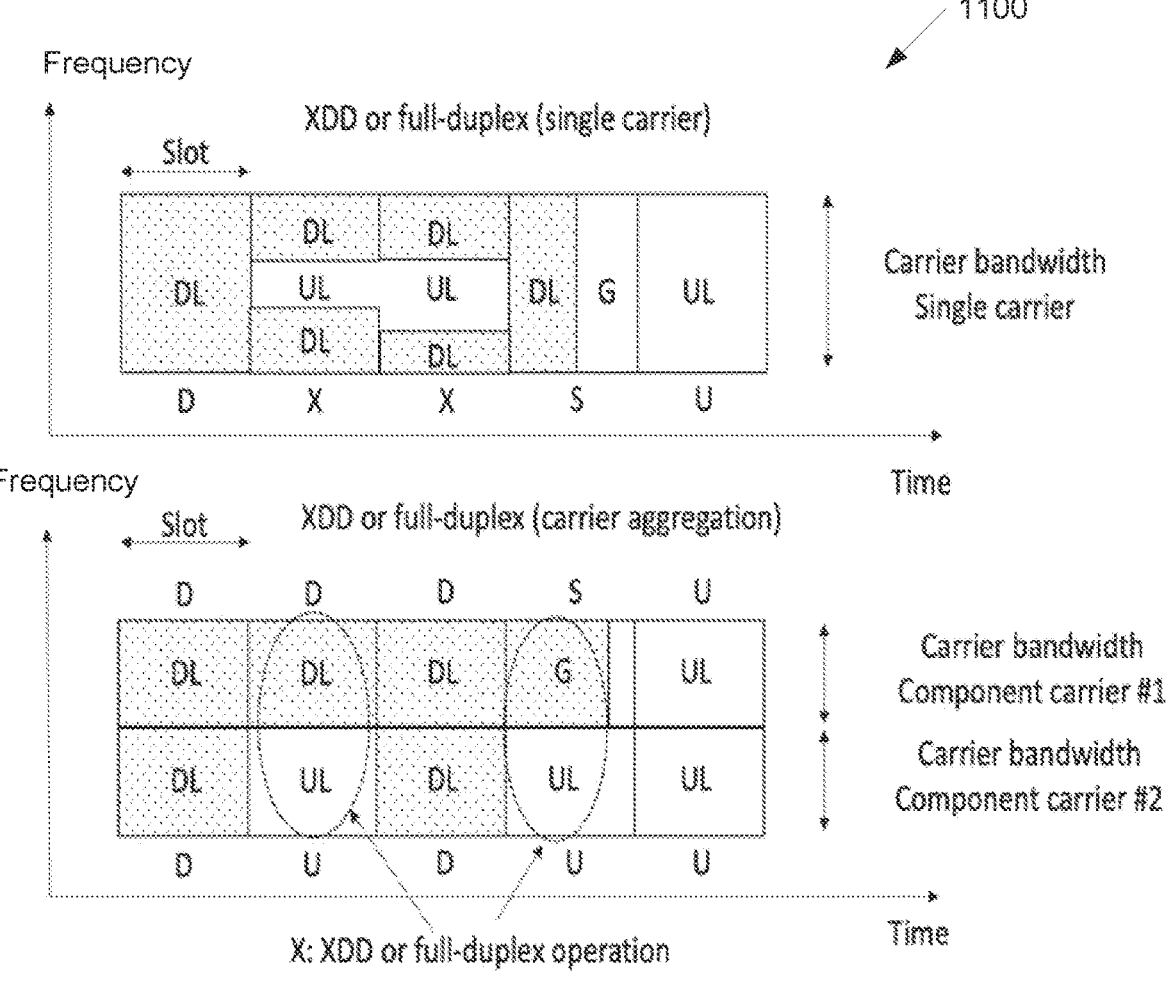
FIG. 11 illustrates two example full-duplex communication system configurations according to the embodiments of the present disclosure.

FIG. 11 illustrates two example full-duplex communication system configurations 1100 according to the embodiments of the present disclosure. An embodiment of the two example full-duplex communication system configurations 1100 shown in FIG. 11 is for illustration only.

For a single carrier TDD configuration with full-duplex enabled, slots denoted as X are full-duplex or XDD slots. Both DL and UL transmissions can be scheduled in XDD slots for at least one or more symbols. The term XDD slot is used to refer to a slot where UEs can simultaneously both receive and transmit in at least one or more symbols of the slot if scheduled or assigned radio resources by the base station. A half-duplex UE cannot both transmit and receive simultaneously in an XDD slot or on a symbol(s) of an XDD slot. When a half-duplex UE is configured for transmission in symbols of an XDD slot, another UE can be configured for reception in the symbols of the XDD slot. A full-duplex UE can transmit and receive simultaneously in symbols of an XDD slot, possibly in presence of other UEs scheduled or assigned resources for either DL or UL in the symbols of the XDD slot. Transmissions by a UE in a first XDD slot can use same or different frequency-domain resources than in a second XDD slot, wherein the resources can differ in bandwidth, a first RB, or a location of the center carrier.

For a dual-carrier (carrier aggregation) TDD configuration with full-duplex enabled, a UE receives in a slot on CC #1 and transmits in at least one or more symbol(s) of the slot on CC #2. In addition to D slots used only for transmissions/receptions by a gNB/UE, U slots used only for receptions/transmissions by the gNB/UE, and S slots for also supporting DL-UL switching, full-duplex slots with both transmissions/receptions by a gNB or a UE that occur on same time-domain resources, such as slots or symbols, are labeled by X. For the example of TDD with SCS=30 kHz, single carrier, and UL-DL allocation DXXSU (2.5 msec), the second and third slots allow for full-duplex operation. UL transmissions can also occur in a last slot (U) where the full UL transmission bandwidth is available. XDD slots or symbol assignments over a time period/number of slots can be indicated by a DCI format in a PDCCH reception and can then vary per unit of the time period, or can be indicated by higher layer signaling, such as via a MAC CE or RRC.

In NR TDD network deployments, the choice of the UL-DL frame configuration impacts the relative capacity split between DL and UL, the achievable DL and UL latencies for data and control signaling, and the maximum cell radius. A guard period (GP) with no scheduled DL or UL transmissions is required to separate the DL and UL allocations in the TDD system. The duration of the GP measured in microseconds defines a safety zone distance beyond which the DL and UL may start overlapping and interfere each other even if the TDD network is perfectly synchronized. Dimensioning of the safety zone distance in TDD networks first accounts for deployment and signal propagation aspects. At the speed of light, the radio waves travel 300 m in 1 μs. To achieve a 15 km safety range, about 50 s GP may be required from when the transmitter switches off to when the receiver is switched on. If a 40 km safety zone is required, a 134 μs GP may be necessary.

In LTE TDD networks, the duration of GPs is provided through the selection of up to 9 different Special Subframe formats. In NR TDD networks, the slot formats defined in 3GPP standard specification provide the number of guard symbols. The dimensioning for the safety distance provided by the choice of the GP duration may also consider transient periods for switching off the transmitter as well as the timing advance offset. Both these factors reduce the practical safety range obtained from accounting for BTS-to-BTS propagation and signal attenuation in the TDD deployment.

A greater GP allows for larger safety zones and allows to better tolerate network and UE side timing alignment errors, but it comes at the cost of capacity and peak throughput. For example, for SCS=30 kHz with DDDSU and a GP of 5 symbols provided by the NR slot format in the Special Slot, a 50 km safety zone is dimensioned, but it costs around 7% of the system capacity. For SCS=30 kHz, typical settings in NR TDD macro networks for the number of guard symbols are 2 or 4. Controlling the UE timing advance is an important mechanism in TDD networks to avoid UL-to-DL or DL-to-UL interference given the provided duration of the GP to separate DL and UL transmission periods.

When considering NR TDD networks with support for full-duplex or XDD operation, proper timing control and determination of the UL transmit timing become significantly more challenging due to the addition of more UL-to-DL and DL-to-UL interference paths during system operation.

Figure 12:
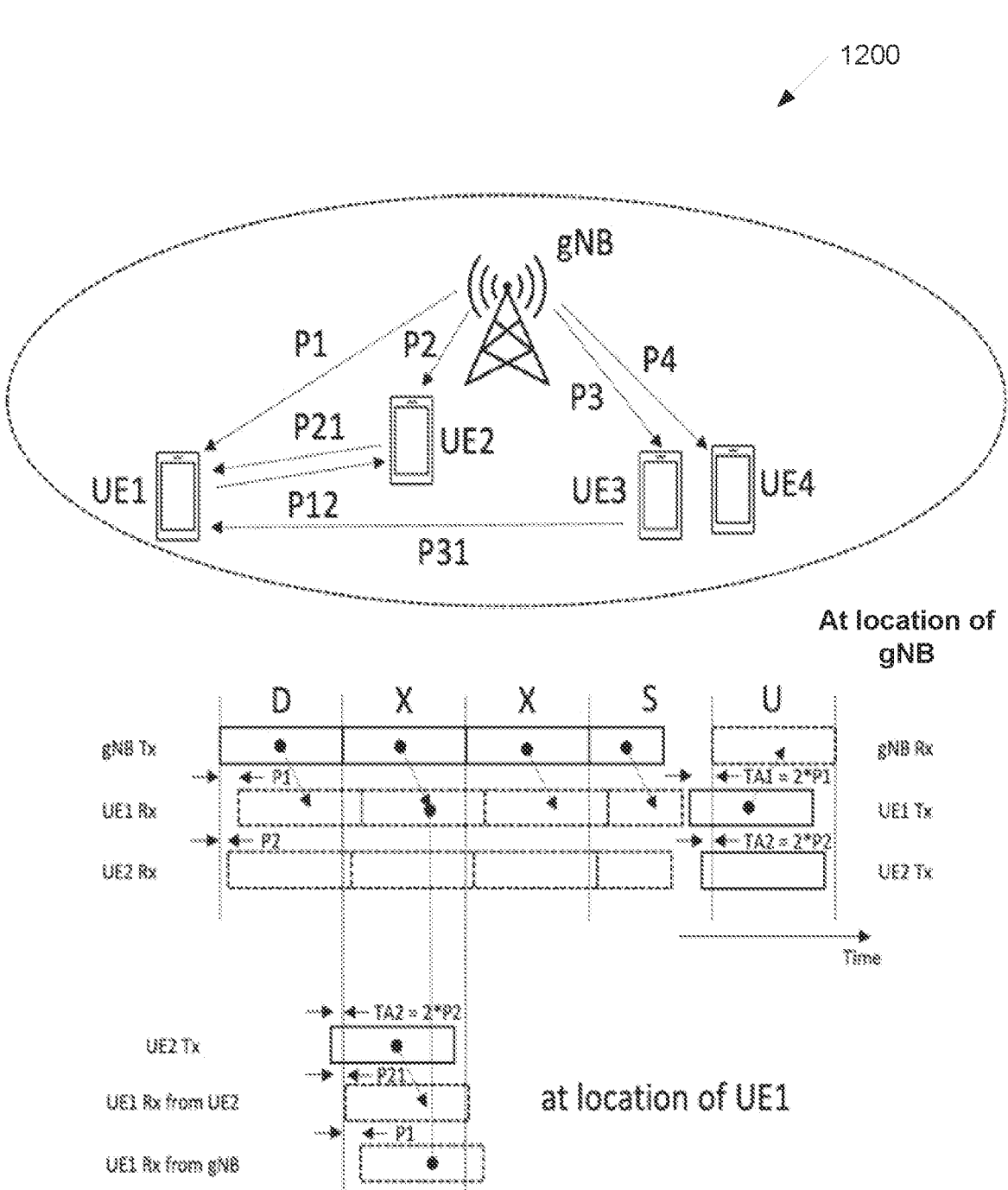
FIG. 12 illustrates Tx and Rx timings in a full-duplex communications system according to the embodiments of the present disclosure.

FIG. 12 illustrates Tx and Rx timings in a full-duplex communications system 1200 according to the embodiments of the present disclosure. An embodiment of the Tx and Rx timings in a full-duplex communications system 1200 shown in FIG. 12 is for illustration only.

In FIG. 12, the NR TDD gNB uses SCS=30 kHz and a UL-DL frame allocation of type a DDDSU with duration 2.5 msec. A UE1, a UE2, a UE3, and a UE4 are served by a gNB. Note that the timing advance settings TA1, TA2, TA3, and TA4 for the UE1, the UE2, the UE3, and the UE4 are determined based on the respective UE distances to the gNB. Transmissions and receptions from the gNB to the UE1, the UE2, the UE3, and the UE4 are subject to one-way propagation delays P1, P2, P3, and P4, respectively. Full-duplex communication is supported by the gNB and enabled for the 2nd and $3^{rd}$ slot, e.g., DXXSU.

Full-duplex communication in the TDD cell uses frequency-orthogonal subbands, e.g., DL transmissions from the gNB to a UE and UL reception from a UE by the gNB do not overlap in frequency domain. UL transmissions in full-duplex slots can be allocated to the center subband in the $2^{nd}$ and $3^{rd}$ slot. The UE1-UE4 operate half-duplex, e.g., The UE1-UE4 can either transmit or receive in a slot, but no simultaneous DL reception and UL transmission from a same UE can occur in a slot. The small relative distance from the UE1 to the gNB results in a small TA1 value. The UE2 is further away from the gNB and requires a larger TA2 value. The UE3 and the UE4 require timing advance values with TA1<TA3<TA4<TA2.

FIG. 12 shows the relative Tx and Rx timings of transmissions for 2 cases, first when received at the gNB location and second when received at the location of UEL. Interfering UL transmissions from UE2 in the $2^{nd}$ XDD slot are received by the UE1 earlier than DL transmissions from the gNB in the slot. UL transmissions from the UE2 interfere not only the PDSCH simultaneously transmitted by the gNB to the UE1 in the $2^{nd}$ slot, but also the symbols carrying PDCCH at the beginning of the $2^{nd}$ slot. Arrival time of the interfering UL transmission from the UE2 at the location of the UE1 during DL reception by the UE1 in the $2^{nd}$ slot is determined by 3 relative one-way propagation delays, e.g., a UE2-gNB (P2), a UE1-gNB (P1), and a UE2-UE1 (P21).

Note that UL-DL interference in the $2^{nd}$ slot occurs even with subband full-duplex operation. The roll-off of the filtered Tx OFDM BB waveform from the UE2 creates leakage across the entire channel BW including the DL subband(s) used for DL reception by the UE1. Guard RBs or guard tones between the UL and DL subband(s) in the 2nd slot can mitigate, but not fully eliminate leakage created by the UL-to-DL interference from the UE2 UL transmissions. The amount of leakage and their impact on the UE1 demodulation performance depends on the DL receive power levels of the desired DL signal and the interfering UL signal which are a function of the gNB DL transmit power or EPRE, the distance between the gNB and the UE1, the UE2 UL transmit power or EPRE, the distance between the UE2 and the UE1 and the amount of Tx and/or Rx filtering by the UE 1 and the UE2.

Although not shown in FIG. 12, UE-to-UE or UL-to-DL interference during full-duplex operation can also affect the subsequent, e.g., $3^{rd}$ XDD slot. When the UE1 is closer to the gNB, the UE1 uses a smaller TA1 value. Interfering UL transmissions from the UE2 in the $2^{nd}$ slot may then be received later than the DL transmissions from the gNB for a sufficiently large P21. Interference from the UE2 from UL transmissions in the $2^{nd}$ slot may then affect the first received symbol(s) of the $3^{rd}$ slot.

When considering transmissions in a full-duplex capable communication system several issues of existing state-of-the-art technology need to be overcome.

A first issue relates to the timing advance procedure in a TDD cell supporting full-duplex operation. The existing TA procedure controls the UE UL transmit timing with respect to the propagation delay of the UE to the gNB. The purpose of the existing timing advance procedure is to align the receive timings of multiple UL signals transmitted by multiple UEs at the location of the gNB, e.g., ideally within a CP.

For example, the gNB can set the timing advance values TA1=2*P1 for the UE1 and TA2=2*P2 for the UE2 to align the receive timings of UL signals transmitted by the UE1 and the UE2 in a normal UL slot as illustrated in FIG. 12. It can then be shown that the interfering UL signal transmitted by the UE2 in the $2^{nd}$ XDD slot is received by the UE1 with a relative timing difference $\Delta_{21}$=P1+P2−P21 when compared to the desired DL signal from the gNB. If the UE1 is scheduled to transmit the UL signal in the $2^{nd}$ XDD slot and the UE2 is scheduled DL reception instead, the UE2 may experience a timing difference $\Delta_{12}$=P2+P1−P12.

Under the assumptions that P12=P21 and TA1=2*P1 and TA2=2*P2, the following observations can be made.

In one example, the value of $\Delta_{21}$ and $\Delta_{12}$ is the same, e.g., the pair UE1 and UE2 experiences the same relative timing difference of the interfering UL signal with respect to the desired DL signal. If the UE1 receives in the DL and the UE2 transmits in the UL or if the UE2 receives in the DL and the UE1 transmits in the UL, the resulting relative timing difference values are the same.

In another example, the relative timing difference is largest when P12=P21=0, e.g., the UE1 and the UE2 are co-located (or at least very close). $\Delta_{21}$=$\Delta_{12}$=TA1=TA2.

In yet another example, even at non-zero distances of the UE1 and the UE2 from the gNB, the relative timing difference can become 0 when P1+P2=P12 (or =P21).

In yet another example, another pair of UE3 and UE4 may experience a different value for their relative timing difference $\Delta_{34}=\Delta_{43}$ when allocated for DL reception and UL transmission in the $3^{rd}$ XDD slot.

In yet another example, if the UE3 and the UE2 were both to transmit their UL in the $2^{nd}$ XDD slot while the UE1 receives a DL signal from the gNB, the values of the relative timing differences $\Delta_{21}$ and $\Delta_{31}$ may be different, because they depend on the one-way propagation delays of the UE1 (P1), the UE2 (P2), and the UE3 (P3) with respect to the gNB, and the relative distances UE2-UE1 (P21) and UE3-UE1 (P31). When UL signals from multiple UEs are simultaneously transmitted in the XDD slot, the received DL signal is subjected to interference with a spread of relative timing differences with respect to the interfering UL signals.

Note that the relative timing difference value(s) in the full-duplex slot may change more rapidly than the values of the one-way propagation delays with UE movement because of the presence of the one-way delay terms P21 and P31. Sixth, when the gNB sets TA2=2*P2 and TA3=2*P3 for the UE2 and the UE3, their UL transmissions may still be received time-aligned by the gNB in both the normal UL slot and the XDD slot. Seventh, when TA1≠2*P1 and/or TA2≠2*P2, e.g., when one-way propagation delay is not perfectly compensated through the gNB controlled timing advance procedure, then $\Delta_{21}\neq\Delta_{12}$. Full-duplex scheduling is not reciprocal anymore with respect to the relative timing difference experienced by the UE1 and the UE2 for the $2^{nd}$ XDD slot.

Note that UE-autonomous adjustment of the UE maintained timing advance value to meet the reference timing within the allowed timing error limit is integral part of existing TA procedures when tracking the first detected path (in time) of a DL frame from the serving cell. The UE may adjust the maintained $N_{TA}$ value autonomously. After the random access procedure where the absolute timing advance value is provided to the UE by the gNB during initial access, the gNB often does not know the exact value of the $N_{TA}$ internally maintained by the UE. The gNB can only know the sequence of MAC CE timing commands $T_A$ which the gNB has previously issued to the UE in RRC_CONNECTED mode.

The relative timing difference experienced by a receiving UE in the DL subband of an XDD slot may often be more than the CP, e.g., 4.7 us (or 2.3 us) for 15 (or 30 kHz) SCS. In consequence, the provisioning of guard symbols for PDCCH, PDSCH, PUCCH and/or PUSCH transmission and reception becomes necessary to protect the DL and/or UL channels or signals from unwanted UE-to-UE interference in the full-duplex slots. This is detrimental to spectral efficiency and penalizes the DL and/or UL throughputs in TDD cells supporting full-duplex transmissions. Note that the use of multiple TAGs as by existing technology may require the configuration and use of multiple component carriers in the UE when deploying full duplex in the TDD communications system.

Requiring the use of carrier aggregation and/or intra-band dual connectivity for purpose of overcoming the described shortcomings of the single-carrier timing advance procedure is undesirable, because of the resulting RF constraints. Use of the carrier aggregation and/or dual-connectivity results in operational constraints such as need for support for single-carrier UL mode when simultaneous intra-band Tx and Rx is not possible, additional Rx-Tx switching delays, and reduced UL link budget. A solution is therefore sought after to provide transmission timing control for UEs operating on a carrier in a full-duplex capable TDD network.

Various embodiments of the present disclosure provide for use of a UE timing advance procedure with configurable transmit timing adjustment value(s), timing slot groups, per-channel (or per-signal) configurable timing adjustments and UE transmit timing determined from signal reception conditions.

In various embodiments, different configurable timing adjustment value(s) are provided for a UE for use in different slot(s) of the same serving cell (NR carrier) instead of single configurable value today. In these embodiments, a UE uses a different configured timing adjustment value in a subband full duplex (SBFD) slot versus normal UL slot. For example, UE uses different timing adjustment values in different SBFD slots. In some example, signaling of configurable values is through RRC, MAC CE or DCI or tabulated, and in some instances, include a default setting.

In various embodiments, configurable timing slots groups are provided. In these embodiments, a timing slot group is set of slots associated with same configurable adjustment value. For example, a single serving cell can configure UE with 2 or more timing slot groups.

For example, timing slot groups identify symbols/slots through bitmaps or alike.

In various embodiments, configurable transmit timing adjustment value(s) additionally depend on UL signal/channel type. In these embodiments, the configurable transmit timing adjustment value(s) are associated with PUSCH or SRS or PUCCH (and different values for different slots they map to). For example, the configurable transmit timing adjustment value(s) may be associated with different transmission formats of same signal/channel, e.g., different for PUCH F0 vs F1.

In various embodiments, configurable transmit timing adjustment value(s) additionally depend on DL signal reception or UL signal transmission conditions. In these embodiments, the conditions may be based on slot or symbol type, associated with timer or counter value, and/or based on received or transmitted signal power or reception quality measurement (e.g., a reference signal received power level (RSRP) or a reference signal received quality (RSRQ) value) and thresholds/hysteresis values.

The UE is provided with a configurable transmit timing adjustment value $N_{delta}$ allowing to adjust the UE UL Tx timing in a slot. A value of $N_{delta}$ can be configured for a slot or a same $N_{delta}$ value can be configured for multiple slots. $N_{delta}$ can be configured per UL signal or per channel type. A same $N_{delta}$ value can be configured for multiple UEs to determine their UL transmit timing in a slot, or different $N_{delta}$ values can be configured for different UEs. $N_{delta}$ value(s) including their associated slot(s), signal or channel type(s) or their associated signal transmission and reception condition(s) can be provided to a UE by means of RRC signaling message(s).

If a same $N_{delta}$ value is provided for multiple UEs in a slot, a common RRC signaling message may be used. A dedicated or common type RRC signaling configuration may be used to provide value(s) of $N_{delta}$ to a UE. $N_{delta}$ value(s) including their associated slot(s), UL signal or channel type(s) or their associated signal transmission and reception condition(s) can be provided to a UE by means of a MAC CE signaling message. The UE may determine a default value for $N_{delta}$ in a slot. $N_{delta}$ value(s) provided to the UE by RRC signaling may be used in conjunction with MAC CE provided $N_{delta}$ values.

Figure 13:
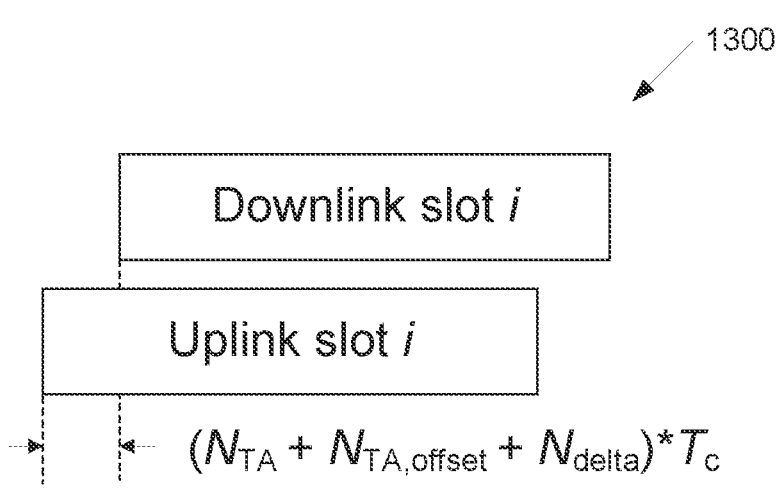
FIG. 13 illustrates an UL-DL timing relations with a timing offset adjustment according to the embodiments of the present disclosure.

FIG. 13 illustrates an UL-DL timing relations with a timing offset adjustment 1300 according to the embodiments of the present disclosure. An embodiment of the UL-DL timing relations with a timing offset adjustment 1300 shown in FIG. 13 is for illustration only.

The UE is provided with a configurable transmit timing adjustment value $N_{delta}$ allowing to adjust the UE UL Tx timing in a slot. As shown in FIG. 13, UL slot number i for transmission from the UE starts $(N_{TA}+N_{TA,offset}+N_{delta})*T_c$ before the start of the corresponding DL slot i at the UE where $N_{TA}$ and $N_{TA,offset}$ are given by 3GPP standard specification. A UE can be provided a value $N_{delta}$ of a transmit timing adjustment in a slot for a serving cell by an RRC and/or MAC CE provided parameter n-TimingAdvanceAdjustment for the serving cell as described in the embodiments of the disclosure. If the UE is not provided n-TimingAdvanceAdjustment for a serving cell, the UE may determine a default value $N_{delta}$ of the transmit timing adjustment in a slot for the serving cell. If a UE is configured with two UL carriers for a serving cell, a same timing advance offset value $N_{delta}$ may be applied to both carriers.

Upon reception of a timing advance command for the serving cell, the UE adjusts the UL timing for a PUSCH, SRS, PUCCH or RACH transmission in a slot of the serving cell based on a value $N_{TA,offset}$ that the UE expects to be same for all the slots in the serving cell and based on the received timing advance command and based on the transmit timing adjustment value $N_{delta}$ provided for the slot.

Different timing adjustment values $N_{delta}$ may be provided for different slots, e.g., a first value $N_{delta,i}$ is provided for slot i and a second value $N_{delta,j}$ is provided for slot j. Upon reception of a timing advance command for the serving cell, the UE adjusts the UL timing for a PUSCH, SRS, PUCCH or RACH transmission in the serving cell in slot i based on $N_{TA,offset}$ that the UE expects to be same for all the slots in the serving cell and based on the received timing advance command and based on the transmit timing adjustment value $N_{delta,i}$ provided for the slot i where the PUSCH, SRS, PUCCH or RACH transmission occurs.

A value for $N_{delta}$ may be encoded jointly with the existing parameter $N_{TA,offset}$ and provided to the UE. Instead of a value $N_{delta}$ provided for a slot, a timing adjustment value may be provided for a symbol time interval or a multiple thereof. A timing adjustment value $N_{delta}$ may be defined with respect to a same or an adjustable or scalable step size and/or desired timing resolution. For example, a value for $N_{delta}$ may be provided as a multiple of $16*64*T_c/2^{\mu}$.

Using the configurable transmit timing adjustment $N_{delta}$ to control the UL transmit timing for UL transmissions from an interfering UE in a slot, the relative receive timing difference in a full-duplex slot can be adjusted with respect to the DL reception of the interfered UE during full-duplex operation in a slot. Reception timing of the UL transmission from the UE by the gNB in the full-duplex slot can be different from reception timing of UL transmissions by that same UE in a normal UL slot. The gNB can adjust the receiver processing accordingly, because the transmit timing offset is set by and known to the gNB. Use of a single timing advance procedure and TA loop is still possible for the UE. For example, the gNB can select and configure timing adjustment values $N_{delta}$ using gNB-side and/or UE-reported measurements, e.g., based on SRS when configured for link adaptation and cross-link interference management reporting.

The provided timing adjustment value $N_{delta}$ may be associated with a set of slots. A set of slots for which a same transmit timing adjustment value $N_{delta}$ is provided is referred to as timing slot group (TSG) in the disclosure.

In one embodiment, a TSG may be configured to contain only a single slot, or there may be only a single TSG, e.g., the TSG comprises all slots. The determination of the transmit timing by UE in a slot may then be described by not using the term "TSG" and substituting the term "slot" for it in the following exemplary procedures described in the disclosure.

When the TSG comprise more than one slot, the slots of the TSG can be consecutive, or the TSG can be non-consecutive. One or multiple TSGs may be configured for the UE by parameter n-tsgList. For example, a first TSG containing a normal UL slot may be configured in the UE. A second TSG containing a full-duplex slot may be configured in the UE. When a transmit timing adjustment value $N_{delta}$ is provided for a TSG, the value $N_{delta}$ is applied by the UE to determine UL transmit timing for a slot in the TSG. The value $N_{delta}$ is not applied by the UE to determine the UL transmit timing in a slot when the slot is not part of the TSG. Different values $N_{delta}$ may be associated with different TSGs, e.g., one or more sets of values $N_{delta}$ may be provided to the UE. When a set of $N_{delta}$ values is provided to the UE, the UE determines a value $N_{delta}$ in the slot from the set of provided a set of $N_{delta}$ values by selecting the value $N_{delta}$ associated with the TSG of the slot.

Figure 14:
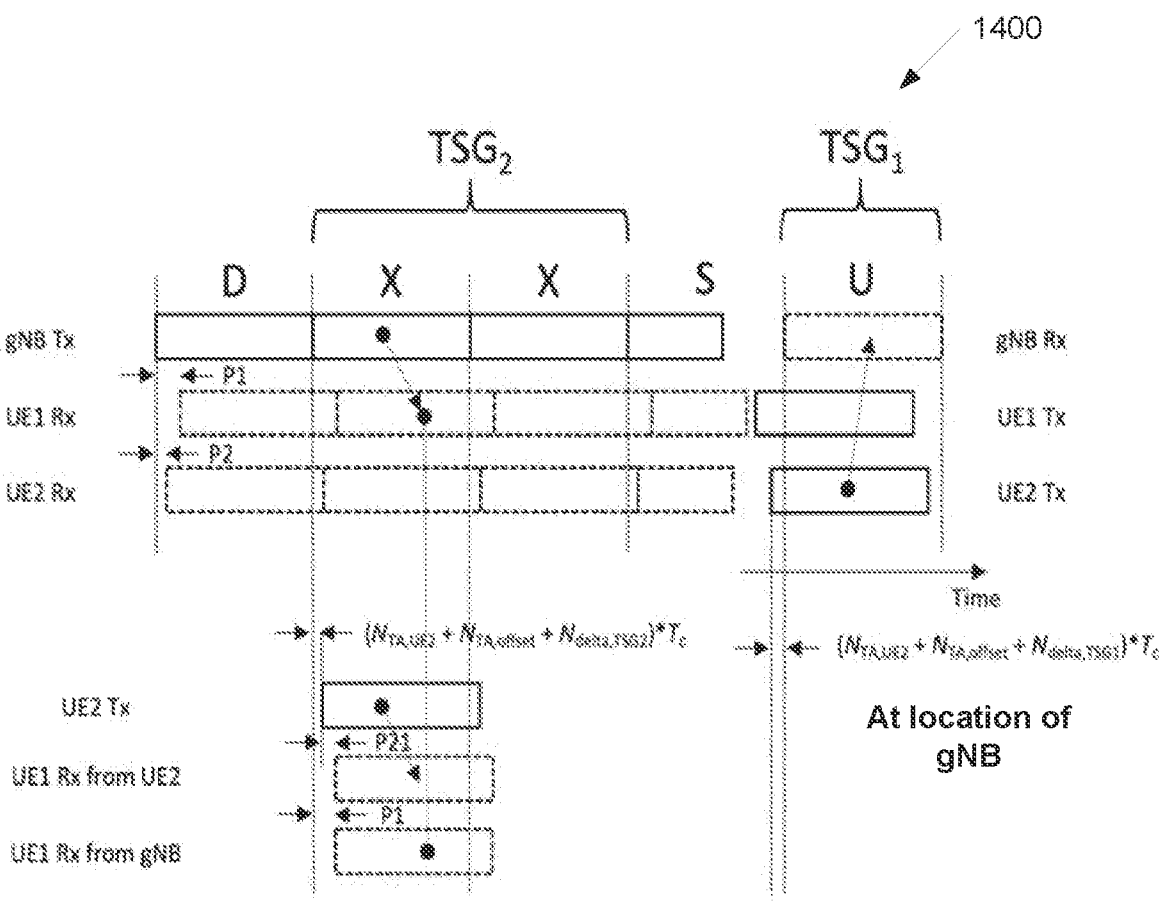
FIG. 14 illustrates UL-DL timing relations with timing slot groups according to the embodiments of the present disclosure.

FIG. 14 illustrates UL-DL timing relations with timing slot groups 1400 according to the embodiments of the present disclosure. An embodiment of the UL-DL timing relations with timing slot groups 1400 shown in FIG. 14 is for illustration only.

As shown in FIG. 14, a first timing slot group, $TSG_1$ and a second timing slot group $TSG_2$ are configured for a UE2. $TSG_1$ contains the normal UL slot, e.g., slot #4 and $TSG_2$ contains the XDD slots, e.g., slot #1 and #2, where slots are numbered from 0 to 4. The UE is provided a first timing adjustment value $N_{delta,TSG1}$ for $TSG_1$ and a second timing adjustment value $N_{delta,TSG2}$ for $TSG_2$. When the UE2 transmits in the UL, the UE2 determines its transmission timing as $(N_{TA}+N_{TA,offset}+N_{delta,TSG2})*T_c$ if the UL transmission of PUSCH, SRS, PUCCH, or RACH occurs in a full-duplex slot. The UE determines a transmission timing as $(N_{TA}+N_{TA,offset}+N_{delta,TSG1})*T_c$ if the UE transmits in the normal UL slot. When the UE2 is provided $N_{delta,TSG1}=0$, UL transmissions from the UE2 in the normal UL slot may result in the determination of transmit timing by the UE2 according to the existing transmit timing procedure rules in that slot.

A UE can be configured with one or more timing slot group (TSG) for a serving cell. A TSG is a set of slots that is configured by RRC for a serving cell with an UL using a timing reference and using a same signaled timing advance value but using a different transmit timing adjustment value. A TSG containing a normal UL slot may be referred to as primary TSG (PTSG), whereas the term secondary TSG (STSG) may refer to other TSGs. For example, an STSG may be configured to comprise slots where full-duplex transmission from/to the base station is possible.

When a TSG m is configured in the UE, UL slot number i for transmission from the UE starts $(N_{TA}+N_{TA,offset}+N_{delta,TSGm})*T_c$ before the start of the corresponding DL slot at the UE where $N_{TA}$ and $N_{TA,offset}$ are given by 3GPP standard specification. If only a single transmit timing adjustment value is provided, the TSG index m can be omitted, e.g., $N_{delta,TSGm}=N_{delta}$.

The UE can be provided one or more values $N_{delta,TSGm}$ of a transmit timing adjustment for a serving cell by an RRC or MAC CE provided parameter n-tsgList for a TSG of the serving cell as described in the embodiments of the disclosure. If the UE is not provided n-tsgList for a TSG of the serving cell, the UE may determine one or more default values $N_{delta,TSGm}$ associated with a TSG for the serving cell.

Upon reception of a timing advance command for the TSG, the UE adjusts UL timing for PUSCH, SRS, PUCCH or RACH transmission in the serving cell for the configured TSG(s) based on a value $N_{TA,offset}$ that the UE expects to be same for all the slots in the TSG(s) and based on the received timing advance command and based on transmit timing adjustment value $N_{delta,TSGm}$ provided for TSG m for slot(s) configured by parameter n-tsgList for TSG m.

In one example, for a timing advance command received on UL slot i and for a transmission other than a PUSCH scheduled by a RAR UL grant or a fallbackRAR UL grant, or a PUCCH with HARQ-ACK information in response to a successRAR, the corresponding adjustment of the UL transmission timing applies from the beginning of UL slot i+k+1 where $$k = \left\lceil N_{slot}^{subframe,\mu} \cdot (N_{T,1} + N_{T,2} + N_{TA,max} + 0.5 / T_{sf}) \right\rceil,$$

where parameters $N_{T,1}$ and $N_{T,2}$ are provided in 3GPP standard specification, $N_{TA,max}$ is the maximum timing advance value in msec that can be provided by a TA command field of 12 bits, and where $$N_{slot}^{subframe,\mu}$$

and $T_{sf}$ are provided in 3GPP standard specification. The UL slot i is the last slot among UL slot(s) overlapping with the slot(s) of PDSCH reception assuming $T_{TA}=0$, where the PDSCH provides the timing advance command and $T_{TA}$ is defined in 3GPP standard specification.

In another example, when a TSG is configured in the UE, the corresponding adjustment of the transmission timing following reception of a timing advance command may be applied either before the first or after the last slot of a sequence of consecutive slots of the TSG, e.g., a same transmit timing during a sequence of consecutive slots configured for TSG m may be maintained by the UE.

When the UE is configured with a TSG m, the UL frame transmission in a slot associated with TSG m takes place $(N_{TA}+N_{TA,offset}+N_{delta,TSGm})*T_c$ before the reception of the first detected path (in time) of the corresponding DL frame from the reference cell. When the transmission timing error between the UE and the reference timing exceeds $\pm T_e$ then the UE adjusts the timing to within $\pm T_e$. The reference timing is $(N_{TA}+N_{TA,offset}+N_{delta,TSGm})*T_c$ before the DL timing of the reference cell. The size of the adjustment steps and the minimum and maximum magnitude of the adjustment steps in a period of time is described in 3GPP standard specification.

Figure 15:
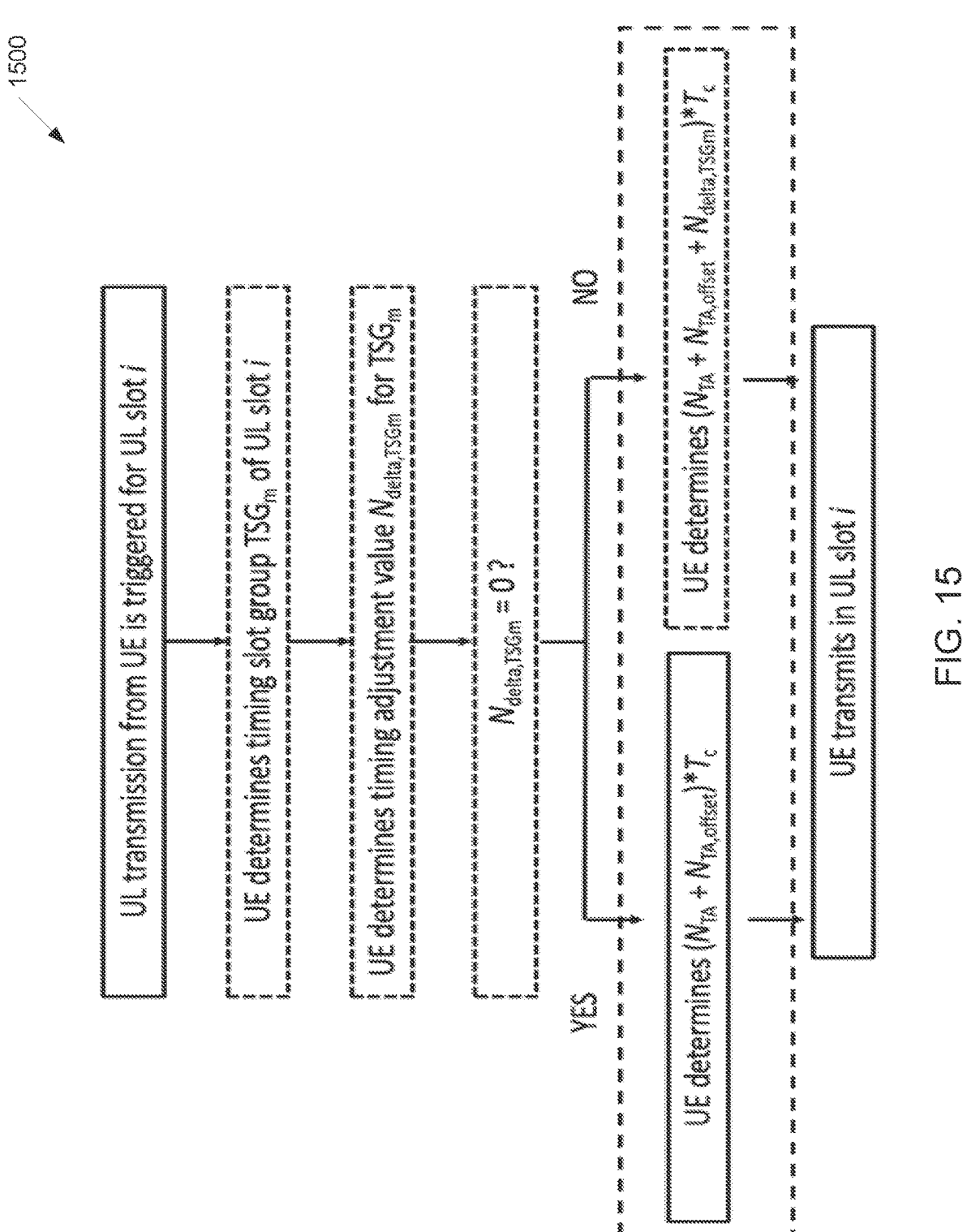
FIG. 15 illustrates an example UE processing chain for determination of UL transmit timing with a timing slot group according to the embodiments of the present disclosure.

FIG. 15 illustrates an example UE processing chain 1500 for determination of UL transmit timing with a timing slot group according to the embodiments of the present disclosure. The UE processing chain 1500 as may be performed by a UE (e.g., 111-116 as illustrated in FIG. 1). An embodiment of the UE processing chain 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

As illustrated in FIG. 15, a UE determines transmit timing for an UL transmission starting in slot i. The UE determines the timing slot group of the slot i for the UL transmission. The UE determines a transmit timing adjustment value $N_{delta,TSGm}$ from a signaled or tabulated value(s) for the timing slot group in which slot i is configured. The UE determines an UL transmit timing for slot i as $(N_{TA}+N_{TA,offset})*T_c$ and applies the transmit timing adjustment value $N_{delta,TSGm}$ to determine the quantity $(N_{TA}+N_{TA,offset}+N_{delta,TSGm})*T_c$ with reference to the timing provided by reception of the first detected path (in time) of the corresponding DL frame (or slot). The UE sets the transmit timing of the UL transmission in UL slot i to the computed value and proceeds with the UL transmission at the determined transmission time.

In one embodiment, the UE is provided with a configurable transmit timing adjustment value $N_{delta}$ allowing to adjust the UE UL Tx timing in a slot per UL signal or channel type, e.g., PUSCH, SRS or PUCCH. A value of $N_{delta}$ per UL signal or channel type can be configured for a slot or a same $N_{delta}$ value per UL signal or channel type can be configured for multiple slots. A same $N_{delta}$ value per UL signal or channel type can be configured for multiple UEs to determine the UL transmit timing of the UL signal or channel type in a slot, or different $N_{delta}$ values can be configured for different UEs. $N_{delta}$ value(s) including their associated slot(s), UL signal or channel type(s) or their associated signal transmission and reception condition(s) can be provided to a UE by means of RRC signaling message(s).

If a same $N_{delta}$ value is provided for multiple UEs in a slot, a common RRC signaling message may be used. A dedicated or common type RRC signaling configuration may be used to provide value(s) of $N_{delta}$ per UL signal or channel type to a UE. $N_{delta}$ value(s) including their associated slot(s), UL signal or channel type(s) or their associated signal transmission and reception condition(s) can be provided to a UE by means of a MAC CE signaling message. The UE may determine a default value for $N_{delta}$ in a slot. $N_{delta}$ value(s) provided to the UE by RRC signaling may be used in conjunction with MAC CE provided $N_{delta}$ values.

Different timing adjustment values $N_{delta}$ may be provided for UL signals or channels of different types and formats. For example, a first value $N_{delta,SRS}$ is provided for UL transmissions of SRS by the UE, a second value $N_{delta,PUSCH}$ is provided for UL transmissions of PUSCH by the UE or a third value $N_{delta,PUCCH}$ is provided for UL transmissions of PUCCH by the UE. In another example, a separate transmit timing adjustment value $N_{delta,PUCCH-F0}$ is provided to the UE for UL transmissions of 1 or 2 symbol long PUCCH format and another timing adjustment value $N_{delta,PUCCH-F1}$ is provided to the UE for UL transmissions of a 4-14 symbol long PUCCH format.

Upon reception of a timing advance command for the serving cell, the UE adjusts the UL timing for a PUSCH, SRS or PUCCH transmission in the serving cell in slot i based on $N_{TA,offset}$ that the UE expects to be same for all the slots in the serving cell and based on the received timing advance command and based on the transmit timing adjustment value $N_{delta,type}$ provided for the slot i where "type" corresponds to the UL transmission format, e.g., PUSCH, SRS or PUCCH.

Using the configurable transmit timing adjustment $N_{delta,type}$ to control the UL transmit timing for UL transmissions from an interfering UE in a slot, the relative receive timing difference in a full-duplex slot can be best adjusted with respect to the signal characteristics of the interfering UL transmission during full-duplex operation in a slot. For short UL transmissions, e.g., SRS with only L=1 or 2 symbol groups or PUCCH F0 with 1 or 2 symbols, there may not need to adjust the transmit timing in a full duplex slot due to their sequence based transmission format.

Moreover, transmission of such UL signals can be configured or scheduled avoiding the last symbols of a slot. For longer UL transmission occupying multiple symbols in a slot, it is desirable to adjust the transmit timing of the interfering UL transmission in a full-duplex slot to avoid UL-to-DL interference and the need for guard symbols. Reception timing of the UL transmission for a particular UL signal or channel type from the UE by the gNB in the full-duplex slot can be different from the reception timing of UL transmissions by that same UE in a normal UL slot. The gNB can adjust the receiver processing accordingly, because the transmit timing offset is set by and known to the gNB. Use of a single timing advance procedure and TA loop is still possible for the UE.

Figure 16:
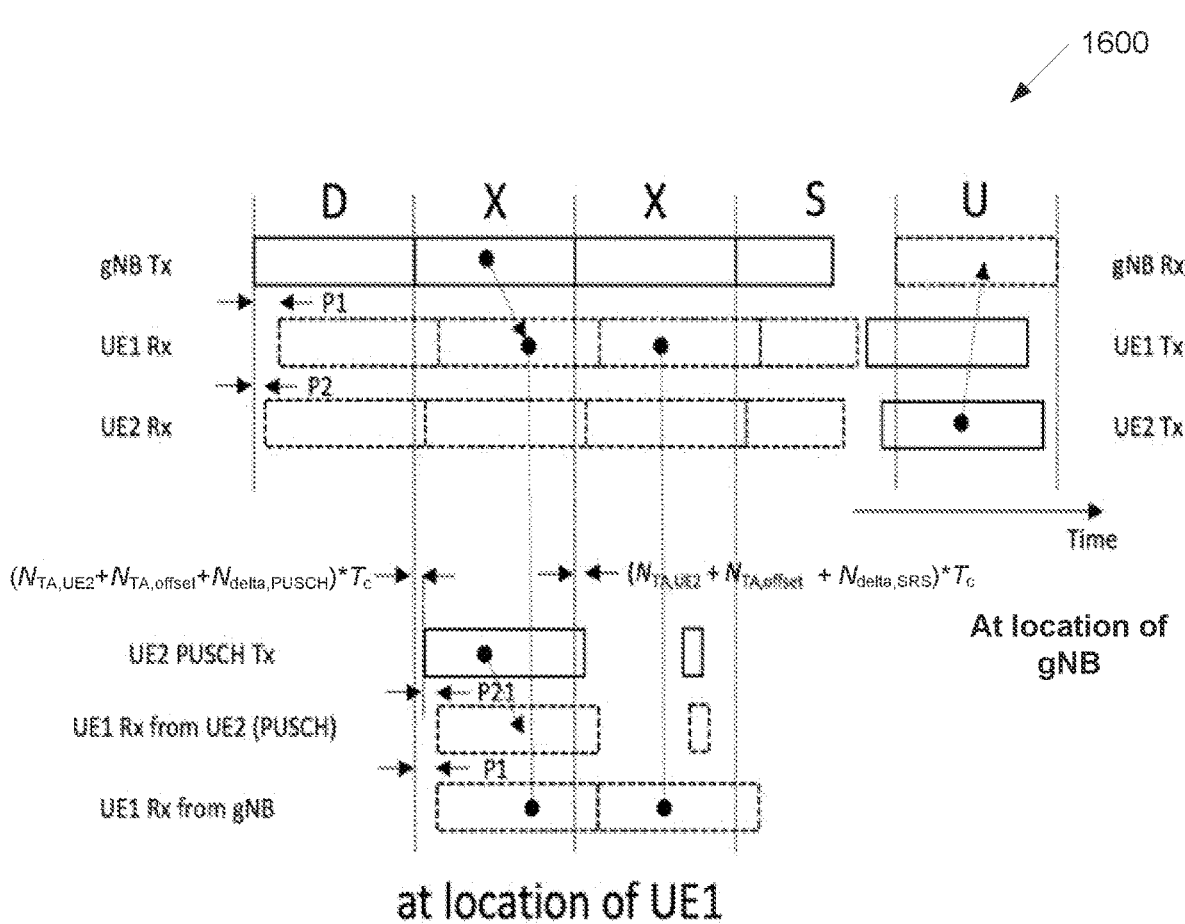
FIG. 16 illustrates UL-DL timing relations with different UL signal or channel types according to the embodiments of the present disclosure.

FIG. 16 illustrates UL-DL timing relations with different UL signal or channel types 1600 according to the embodiments of the present disclosure. An embodiment of the UL-DL timing relations with different UL signal or channel types 1600 shown in FIG. 16 is for illustration only.

As shown in FIG. 16, a UE2 is provided a first timing adjustment value $N_{delta,SRS}$ and a second timing adjustment value $N_{delta,PUSCH}$. When the UE2 transmits SRS in the UL, the UE2 determines the transmission timing as $(N_{TA}+N_{TA,offset}+N_{delta,SRS})*T_c$ if the UL transmission of SRS occurs in a full-duplex slot. The UE determines a transmission timing as $(N_{TA}+N_{TA,offset}+N_{delta,PUSCH})*T_c$ if the UE transmits PUSCH in a full-duplex slot. When the UE2 is provided $N_{delta,SRS}=0$, UL transmissions from the UE2 may result in the determination of transmit timing by UE2 according to the existing transmit timing procedure rules for the SRS transmission in that slot.

In one embodiment, the UE determines a transmit timing adjustment value $N_{delta}$ in a slot depending on DL and/or UL signal transmission or reception conditions.

DL and/or UL signal transmission or reception conditions may include one or more of:

slot and/or symbol types of type D (Downlink), U (Uplink) or F (Flexible) in a TDD common or dedicated UL-DL frame configuration or provided through slot format indication (SFI) such as in DCI F2_0;

slot and/or symbol types of type "simultaneous Tx-Rx," "Rx only," or "UL only," e.g., associated with a slot and/or symbol configuration indicating availability of full-duplex time resources;

a measurement of type received or transmitted signal power (or quality) incl. associated threshold and/or hysteresis values to determine an evaluation metric using a measurement; or a timer or counter value associated with a duration of time during which a signal transmission from a UE is permitted or prohibited.

In one example, a different transmit timing adjustment value $N_{delta,type}$ may be provided for different slots of types U or F, e.g., a first value $N_{delta,F}$ is provided for a slot of type "F" and a second value $N_{delta,U}$ is provided for a slot of type "U." Upon reception of a timing advance command for the serving cell, the UE adjusts the UL timing for a PUSCH, SRS, PUCCH or RACH transmission in the serving cell in a slot i based on $N_{TA,max}$ that the UE expects to be same for all the slots in the serving cell and based on the received timing advance command and based on the transmit timing adjustment value $N_{delta,type}$. If slot i is determined to be of type "F," $N_{delta,F}$ is used by the UE to determine the transmit timing adjustment, but $N_{delta,U}$ is used by the UE of slot i is determined to be of type "U."

Using the configurable transmit timing adjustment $N_{delta}$ to control the UL transmit timing for UL transmissions from an interfering UE in a slot, the relative receive timing difference in a full-duplex slot can be autonomously adjusted by the transmitting UE during full-duplex operation in a slot. Reception timing of the UL transmission from the UE by the gNB in the full-duplex slot can be different from reception timing of UL transmissions by that same UE in a normal UL slot. For a slot configured as "U," e.g., only UL transmissions can occur, $N_{delta,j}$ may be configured as 0. The UL transmissions from the UE in the normal slot follow existing transmit timing procedures.

For a slot configured as "F," e.g., where either DL or UL transmissions in a single direction or simultaneous DL and UL transmissions using full duplex can occur, $N_{delta,j}$ may be configured to compensate for the relative receive timing difference in the slot. The UL transmissions from the UE in the normal slot follow existing transmit timing procedures The gNB can adjust the receiver processing accordingly, because the transmit timing offset that a UE determines in a slot is derived from RRC provided UL-DL configuration and/or gNB-internal scheduling.

Figure 17:
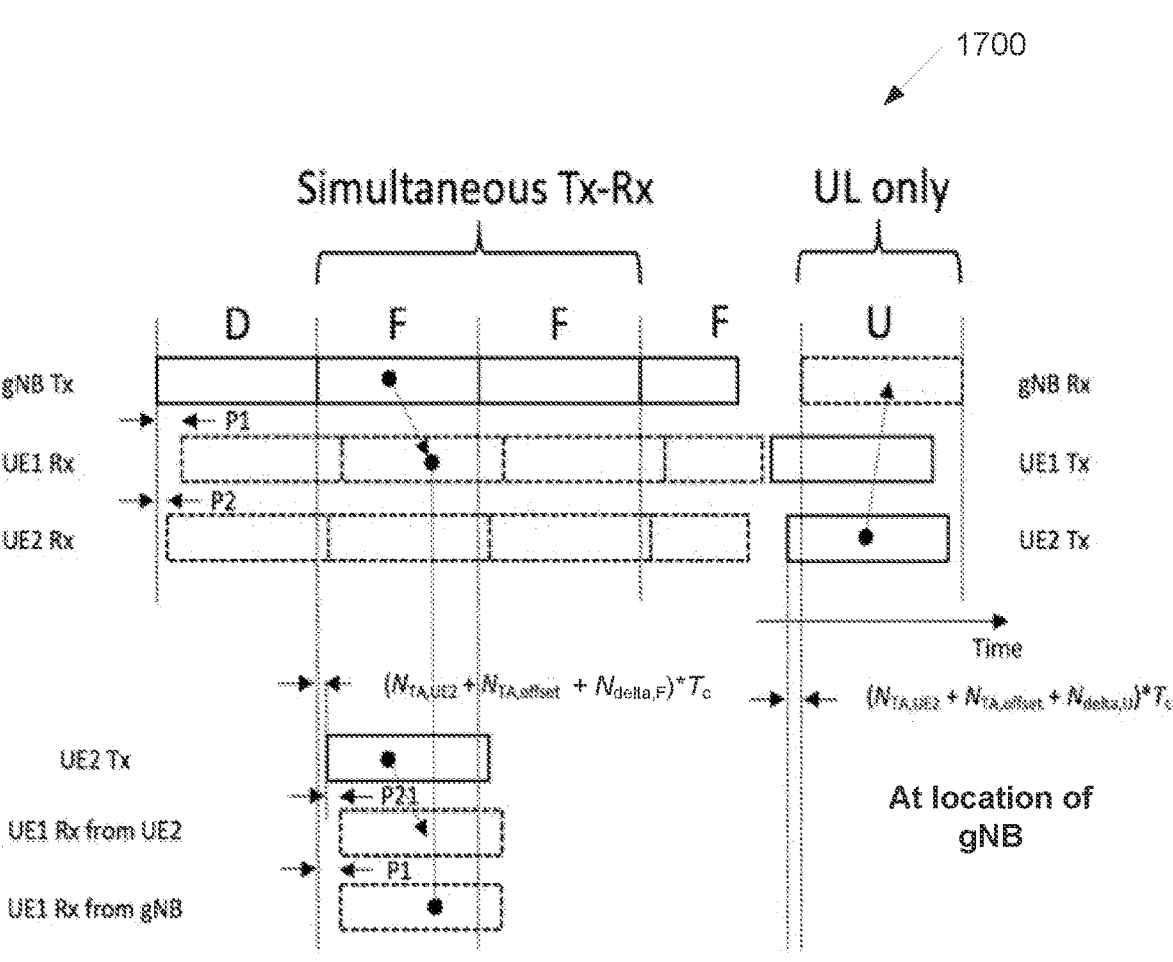
FIG. 17 illustrates UL-DL timing relations with signal reception conditions according to the embodiments of the present disclosure.

FIG. 17 illustrates UL-DL timing relations with signal reception conditions 1700 according to the embodiments of the present disclosure. An embodiment of the UL-DL timing relations with signal reception conditions 1700 shown in FIG. 17 is for illustration only.

As shown in FIG. 17, a TDD UL-DL frame configuration of type "DFFFU" is provided to a UE1 and a UE2 by means of cell common RRC signaling, e.g., SIB1. The UE2 is provided a first timing adjustment value $N_{delta,F}$ for slots of type "F" and a second timing adjustment value $N_{delta,U}$ for slots of type "U." When the UE2 is scheduled for UL transmission in slot #1 of type "F" the UE2 determines the transmission timing as $(N_{TA}+N_{TA,offset}+N_{delta,F})*T_c$. The UE2 determines a transmission timing as $(N_{TA}+N_{TA,offset}+N_{delta,U})*T_c$ if the UE2 is scheduled to transmit in slot #4. When the UE2 is provided $N_{delta,U}=0$, UL transmissions from the UE2 in the normal UL slot may result in the determination of transmit timing by the UE2 according to the existing transmit timing procedure rules in that slot.

When a timing adjustment value is $N_{delta,type}$ is provided to the UE, UL slot number i for transmission from the UE starts $(N_{TA}+N_{TA,offset}+N_{delta,type})*T_c$ before the start of the corresponding DL slot at the UE where $N_{TA}$ and $N_{TA,offset}$ are given in 3GPP standard specification. If only a single transmit timing adjustment value is provided, the index "type" can be omitted, e.g., $N_{delta,type}=N_{delta}$.

The UE can be provided one or more values $N_{delta,type}$ of a transmit timing adjustment for a serving cell by an RRC or MAC CE provided parameter n-timingAdjustmentList for a serving cell as described in the embodiments of the disclosure. If the UE is not provided n-timingAdjustmentList for a TSG of the serving cell, the UE may determine one or more default values $N_{delta,type}$ associated with an UL signal or channel type for the serving cell.

Upon reception of a timing advance command for the serving cell, the UE adjusts UL timing for PUSCH, SRS, or PUCCH transmission for the serving cell based on a value $N_{TA,max}$ that the UE expects to be same for all the slots in the TSG(s) and based on the received timing advance command and based on the transmit timing adjustment value $N_{delta,type}$ provided for slot(s) configured by parameter n-timingAdjustmentList.

When the UE is provided a timing adjustment value $N_{delta,type}$, the UL frame transmission in a slot associated with an UL signal or channel of "type"={PUSCH, SRS, PUCCH}takes place $(N_{TA}+N_{TA,offset}+N_{delta,type})*T_c$ before the reception of the first detected path (in time) of the corresponding DL frame from the reference cell. When the transmission timing error between the UE and the reference timing exceeds $\pm T_e$ then the UE adjusts the timing to within $\pm T_e$. The reference timing is $(N_{TA}+N_{TA,offset}+N_{delta,type})*T_c$ before the DL timing of the reference cell. The size of the adjustment steps and the minimum and maximum magnitude of the adjustment steps in a period of time is described in 3GPP standard specification.

Figure 18:
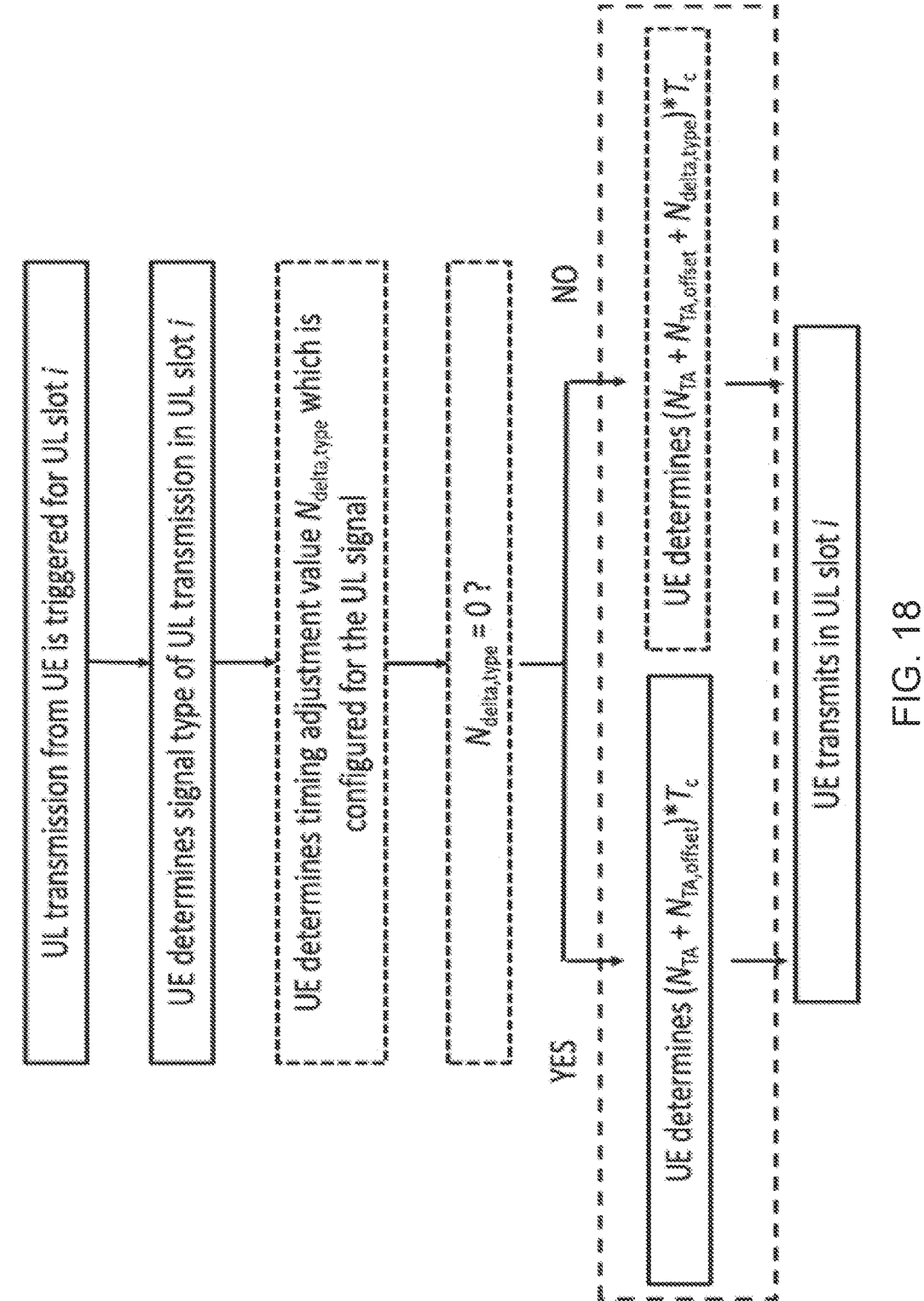
FIG. 18 illustrates an example UE processing chain for determination of UL transmit timing with a signal or channel type according to the embodiments of the present disclosure.

FIG. 18 illustrates an example UE processing chain 1800 for determination of UL transmit timing with a signal or channel type according to the embodiments of the present disclosure. The UE processing chain 1800 as may be performed by a UE (e.g., 111-116 as illustrated in FIG. 1). An embodiment of the UE processing chain 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

FIG. 18 illustrates an example UE transmit timing processing chain according to embodiments of the disclosure. A UE determines transmit timing for an UL transmission starting in slot i. The UE determines the type of the UL signal or channel of the UL transmission in slot i. The UE determines a transmit timing adjustment value $N_{delta,type}$ from a signaled or tabulated value(s) for the UL signal or channel. The UE determines an UL transmit timing for slot i as $(N_{TA}+N_{TA,offset})*T_c$ and applies the transmit timing adjustment value $N_{delta,type}$ to determine the quantity $(N_{TA}+N_{TA,offset}+N_{delta,type})*T_c$ with reference to the timing provided by reception of the first detected path (in time) of the corresponding DL frame (or slot). The UE sets the transmit timing of the UL transmission in UL slot i to the computed value and proceeds with the UL transmission at the determined transmission time.

Figure 19:
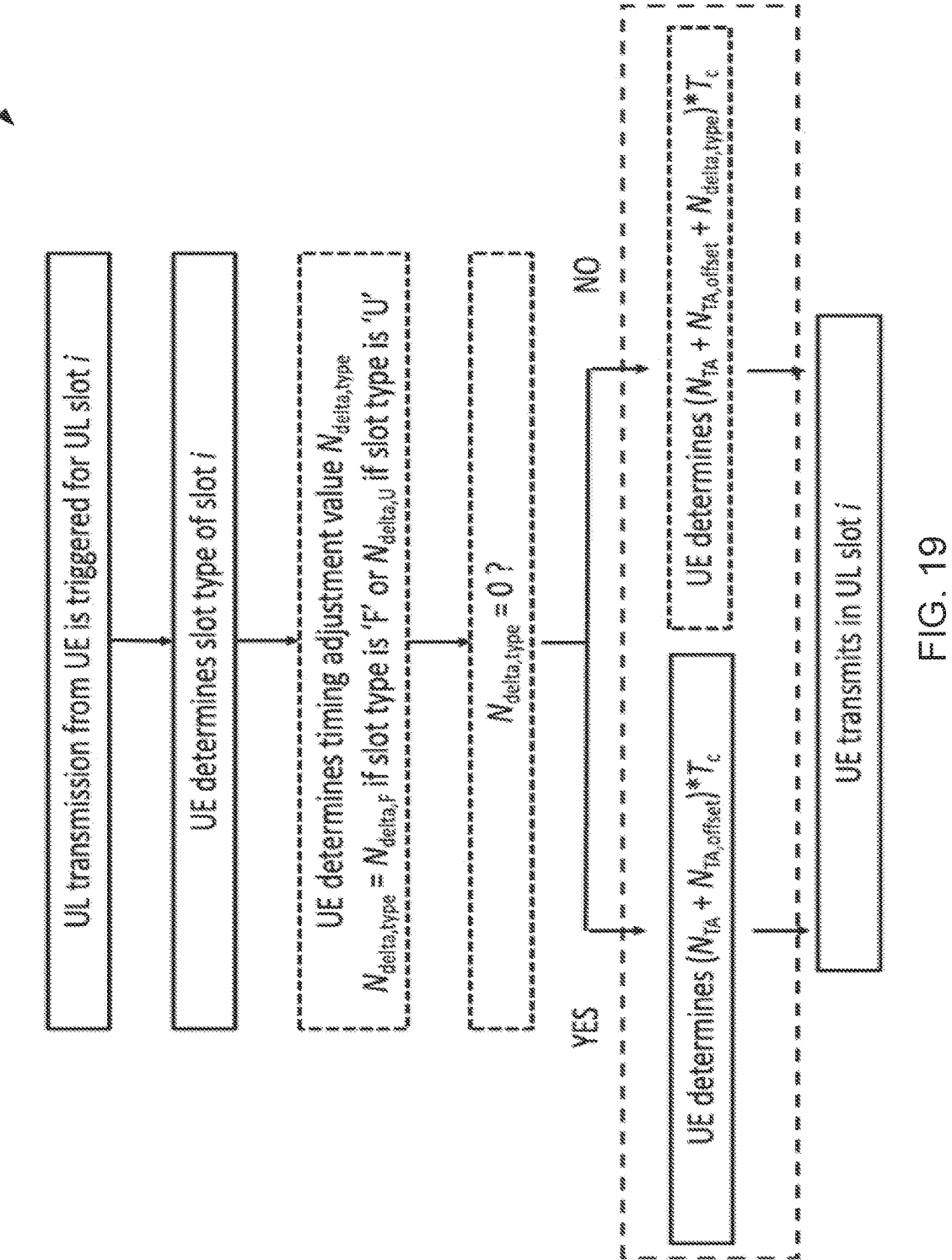
FIG. 19 illustrates an example UE processing chain for determination of UL transmit timing with a signal reception condition according to the embodiments of the present disclosure.

FIG. 19 illustrates an example UE processing chain 1900 for determination of UL transmit timing with a signal reception condition according to the embodiments of the present disclosure. The UE processing chain 1900 as may be performed by a UE (e.g., 111-116 as illustrated in FIG. 1). An embodiment of the UE processing chain 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions.

FIG. 19 illustrates an example UE transmit timing processing chain according to embodiments of the disclosure. A UE determines transmit timing for an UL transmission starting in slot i. The UE determines the slot type for the UL transmission in slot i. The UE determines a transmit timing adjustment value $N_{delta,F}$ from a signaled or tabulated value(s) if the slot is configured as F ("flexible"), or the UE determines a transmit timing adjustment value $N_{delta,U}$ from a signaled or tabulated value(s) if the slot is configured as U ("Uplink"). The UE determines the transmit timing as quantity $(N_{TA}+N_{TA,offset}+N_{delta,type})*T_e$ where $N_{delta,type}=N_{delta,F}$ or $N_{delta,U}$ with reference to the timing provided by reception of the first detected path (in time) of the corresponding DL frame (or slot). The UE sets the transmit timing of the UL transmission in UL slot i to the computed value and proceeds with the UL transmission at the determined transmission time.

A UE may be provided with configuration parameters n-timingAdvanceAdjustment and/or and n-tsgList. These configuration parameters may be provided by RRC signaling messages and IEs. For example, and without loss of generality, these parameters may be signaled from the gNB to the UE as part of the RRC signaling messages of type RRCSetup, RRCReconfiguration, SIB1 or SystemInformation and may be included in RRC IEs of type ServingCellConfig, ServingCellConfigCommon, ServingCellConfigSIB1. These configuration parameters may be of enumerated, listed or sequence type and/or may be encoded as a bit string.

In one example, a value for n-timingAdvanceAdjustment may be provided to the UE as a set of values at the desired resolution such as n-timingAdvanceAdjustment={−5000, −4000, −3000, −2000, −1000, 0, +1000, +2000, +3000, +4000, +5000}. For example, a configuration for n-tsgList may be provided as SEQUENCE (SIZE (1 . . . maxNrofTSGs)) OF Tsg where "Tsg" is a bit string of of size M. For example, M=5 or a multiple thereof. When Tsg=1011001 indicating that the $2^{nd}$ and $3^{rd}$ slot in a sequence of 5 slots are part of the timing slot group. When Tsg={00001}, only the last slot in a sequence of 5 slots is indicated as part of the timing slot group. Alternatively, values for n-timingAdvanceAdjustment and/or n-tsgList may be provided in a MAC CE. When no values are provided to the UE, the UE may select a default value. A default value may be provided in listed or tabulated form for parameters n-timingAdvanceAdjustment and/or n-tsgList. A default value may be 0.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps. Further, any of the above variation embodiments/examples can be utilized independently or in combination with at least one other variation embodiment.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE) for transmitting an uplink (UL) signal or channel associated with a transmission timing procedure, the method comprising:

receiving:

first information for first parameters of a first transmission timing configuration associated with a first subset of slots from a set of slots on a cell, second information for second parameters of a second transmission timing configuration associated with a second subset of slots from the set of slots on the cell, and third information for downlink (DL) and/or UL transmission or reception conditions;

determining a value corresponding to the DL and/or UL transmission or reception conditions for transmission in a slot from the second subset of slots; and transmitting the UL signal or channel in the slot based on:
the first transmission timing configuration based on a
first state of the value corresponding to the DL and/or
UL transmission or reception conditions, and
the second transmission timing configuration based on
a second state of the value corresponding to the DL
and/or UL transmission or reception conditions.

2. The method of claim 1, wherein:
a slot from the first subset of slots is not indicated for
simultaneous transmission and reception during a same
time-domain resource on the cell, and
a slot from the second subset of slots is indicated for
simultaneous transmission and reception during a same
time-domain resource on the cell.

3. The method of claim 1, wherein the first parameters or
the second parameters are associated with different timing
offset parameters, respectively, that are added to an indicated
timing advance value.

4. The method of claim 1, wherein at least one of the first
or second parameters is associated with a timing offset
parameter that uses a default value including a value of zero.

5. The method of claim 1, wherein:
the DL and/or UL transmission or reception conditions are
based on one of:
a slot or symbol number,
a slot or symbol type,
an UL transmission format,
a timer or counter value, or
a signal reception quality value that is one of:
a reference signal received power level (RSRP), or
a reference signal received quality (RSRQ) value; and
the DL and/or UL transmission or reception conditions are
valid when one of:
the slot or symbol number is comprised in the first
subset of slots,
the slot or symbol number is not comprised in the first
subset of slots,
the slot or symbol type is one of a DL type, a flexible
(F) type, or an UL type,
the slot or symbol type is one of subband full duplex
(SBFD) or non-SBFD,
the timer or counter value is less than or greater than a
configured value,
the UL transmission format is one of a physical uplink
control channel (PUCCH), a physical uplink shared
channel (PUSCH), or a sounding reference signal
(SRS), or
a value associated with a measurement of a received
reference signal is equal to or smaller than the signal
reception quality value.

6. The method of claim 1, further comprising:
determining a value of a variable associated with the first
transmission timing configuration based on parameters
associated with the second transmission timing con-
figuration, and
using the value of the variable as a value of a first
parameter of the first transmission timing configura-
tion.

7. The method of claim 1, further comprising:
determining a transmission timing for transmitting the UL
signal or channel on another cell using the first trans-
mission timing configuration associated with the first
subset of slots from the set of slots on the cell; or
determining the transmission timing for transmitting the
UL signal or channel on the other cell using the second
transmission timing configuration associated with the
second subset of slots from the set of slots on the cell.

8. A user equipment (UE) comprising:
a transceiver configured to receive:
first information for first parameters of a first transmis-
sion timing configuration associated with a first
subset of slots from a set of slots on a cell,
second information for second parameters of a second
transmission timing configuration associated with a
second subset of slots from the set of slots on the cell,
and
third information for downlink (DL) and/or uplink
(UL) transmission or reception conditions; and
a processor operably coupled to the transceiver, the pro-
cessor configured to determine a value corresponding
to the DL and/or UL transmission or reception condi-
tions for transmission in a slot from the second subset
of slots,
wherein the transceiver is further configured to transmit
an UL signal or channel in the slot based on:
the first transmission timing configuration based on a
first state of the value corresponding to the DL and/or
UL transmission or reception conditions, and
the second transmission timing configuration based on
a second state of the value corresponding to the DL
and/or UL transmission or reception conditions.

9. The UE of claim 8, wherein:
a slot from the first subset of slots is not indicated for
simultaneous transmission and reception during a same
time-domain resource on the cell, and
a slot from the second subset of slots is indicated for
simultaneous transmission and reception during a same
time-domain resource on the cell.

10. The UE of claim 8, wherein the first parameters or the
second parameters are associated with different timing offset
parameters, respectively, that are added to an indicated
timing advance value.

11. The UE of claim 8, wherein at least one of the first or
second parameters is associated with a timing offset param-
eter that uses a default value including a value of zero.

12. The UE of claim 8, wherein:
the DL and/or UL transmission or reception conditions are
based on one of:
a slot or symbol number,
a slot or symbol type,
an UL transmission format,
a timer or counter value, or
a signal reception quality value that is one of:
a reference signal received power level (RSRP), or
a reference signal received quality (RSRQ) value; and
the condition is valid when one of:
the slot or symbol number is comprised in the first
subset of slots,
the slot or symbol number is not comprised in the first
subset of slots,
the slot or symbol type is one of a DL type, a flexible
(F) type, or an UL type,
the slot or symbol type is one of subband full duplex
(SBFD) or non-SBFD,
the timer or counter value is less than or greater than a
configured value,
the UL transmission format is one of a physical uplink
control channel (PUCCH), a physical uplink shared
channel (PUSCH), or a sounding reference signal
(SRS), or
a value associated with a measurement of a received
reference signal is equal to or smaller than the signal
reception quality value.

13. The UE of claim 8, wherein the processor is further configured to:

determine a value of a variable associated with the first transmission timing configuration based on parameters associated with the second transmission timing configuration, and use the value of the variable as a value of a first parameter of the first transmission timing configuration.

14. The UE of claim 8, wherein the processor is further configured to:

determine a transmission timing for transmitting the UL signal or channel on another cell using the first transmission timing configuration associated with the first subset of slots from the set of slots on the cell; or determine the transmission timing for transmitting the UL signal or channel on the other cell using the second transmission timing configuration associated with the second subset of slots from the set of slots on the cell.

15. A base station (BS) comprising:

a transceiver configured to transmit:

first information for first parameters of a first transmission timing configuration associated with a first subset of slots from a set of slots on a cell, second information for second parameters of a second transmission timing configuration associated with a second subset of slots from the set of slots on the cell, and third information for downlink (DL) and/or uplink (UL) transmission or reception conditions; and a processor operably coupled to the transceiver, the processor configured to determine a value corresponding to the DL and/or UL transmission or reception conditions for reception in a slot from the second subset of slots, wherein the transceiver is further configured to receive an UL signal or channel in the slot based on:

the first transmission timing configuration based on a first state of the value corresponding to the DL and/or UL transmission or reception conditions, and the second transmission timing configuration based on a second state of the value corresponding to the DL and/or UL transmission or reception conditions.

16. The BS of claim 15, wherein:

a slot from the first subset of slots is not indicated for simultaneous transmission and reception during a same time-domain resource on the cell, and a slot from the second subset of slots is indicated for simultaneous transmission and reception during a same time-domain resource on the cell.

17. The BS of claim 15, wherein the first parameters or the second parameters are associated with different timing offset parameters, respectively, that are added to an indicated timing advance value.

18. The BS of claim 15, wherein at least one of the first or second parameters is associated with a timing offset parameter that uses a default value including a value of zero.

19. The BS of claim 15, wherein:

the DL and/or UL transmission or reception conditions are based on one of:

a slot or symbol number, a slot or symbol type, an UL transmission format, a timer or counter value, or a signal reception quality value that is one of:

a reference signal received power level (RSRP), or a reference signal received quality (RSRQ) value; and the DL and/or UL transmission or reception conditions are valid when one of:

the slot or symbol number is comprised in the first subset of slots, the slot or symbol number is not comprised in the first subset of slots, the slot or symbol type is one of a DL type, a flexible (F) type, or an UL type, the slot or symbol type is one of subband full duplex (SBFD) or non-SBFD, the timer or counter value is less than or greater than a configured value, the UL transmission format is one of a physical uplink control channel (PUCCH), a physical uplink shared channel (PUSCH), or a sounding reference signal (SRS), or a value associated with a measurement of a received reference signal is equal to or smaller than the signal reception quality value.

20. The BS of claim 15, wherein parameters associated with the second transmission timing configuration indicate a value of a variable, associated with the first transmission timing configuration, to be used a value of a first parameter of the first transmission timing configuration.

* * * * *